United States Patent
Main et al.

(10) Patent No.: US 6,990,549 B2
(45) Date of Patent: Jan. 24, 2006

(54) LOW PIN COUNT (LPC) I/O BRIDGE

(75) Inventors: Kevin K. Main, Plano, TX (US); Charles Michael Campbell, McKinney, TX (US); Harry W. Hartjes, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 525 days.

(21) Appl. No.: 09/990,854

(22) Filed: Nov. 9, 2001

(65) Prior Publication Data
US 2003/0093607 A1 May 15, 2003

(51) Int. Cl.
G06F 1/16 (2006.01)
G06F 13/36 (2006.01)
G06F 13/00 (2006.01)

(52) U.S. Cl. ............... 710/306; 710/306; 710/128; 710/129; 710/303; 361/686

(58) Field of Classification Search ............... 710/306, 710/128, 303, 129; 361/686
See application file for complete search history.

(56) References Cited

U.S. PATENT DOCUMENTS

| | | | |
|---|---|---|---|
| 5,805,833 A | | 9/1998 | Verdun |
| 5,909,559 A | | 6/1999 | So |
| 5,935,224 A | * | 8/1999 | Svancarek et al. ............ 710/63 |
| 6,029,215 A | | 2/2000 | Watts, Jr. et al. |
| 6,070,214 A | * | 5/2000 | Ahern .................. 710/315 |
| 6,088,752 A | * | 7/2000 | Ahern .................. 710/303 |
| 6,131,127 A | * | 10/2000 | Gafken et al. ............ 710/1 |
| 6,243,727 B1 | | 6/2001 | Watts, Jr. |
| 6,338,680 B1 | * | 1/2002 | Connors ................. 463/43 |
| 6,594,719 B1 | * | 7/2003 | Ahern et al. ............. 710/300 |
| 6,687,779 B1 | * | 2/2004 | Sturm et al. ............. 710/305 |
| 6,725,310 B2 | * | 4/2004 | Shoobe et al. ............ 710/303 |
| 6,735,663 B2 | * | 5/2004 | Watts et al. ............. 710/313 |

OTHER PUBLICATIONS

Diana Schulz, Mobility Electronics teams with LSI Logic to develop next generation Split Bridge technology chips, Feb. 11, 2000, LSI Logic Corporate News.*

* cited by examiner

Primary Examiner—Paul R. Myers
Assistant Examiner—Christopher Daley
(74) Attorney, Agent, or Firm—Robert D. Marshall, Jr.; W. James Brady, III; Frederick J. Telecky, Jr.

(57) ABSTRACT

A low pin count (LPC) input/output (I/O) bridge device and method for a portable computer having a plurality of legacy ports and a docking connector. The LPC I/O bridge device includes an LPC controller coupled to the legacy ports and docking connector. The LPC controller is adapted to detect whether the portable computer is coupled to a docking station via the docking connector and route data transmissions to the legacy ports, docking connector, or both, based on information received from an LPC interface. Serialization logic coupled to the LPC controller serializes data transmissions routed to the docking connector.

12 Claims, 12 Drawing Sheets

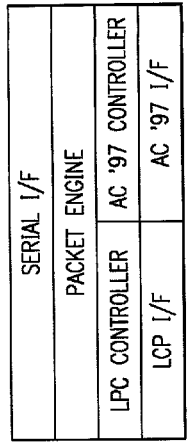
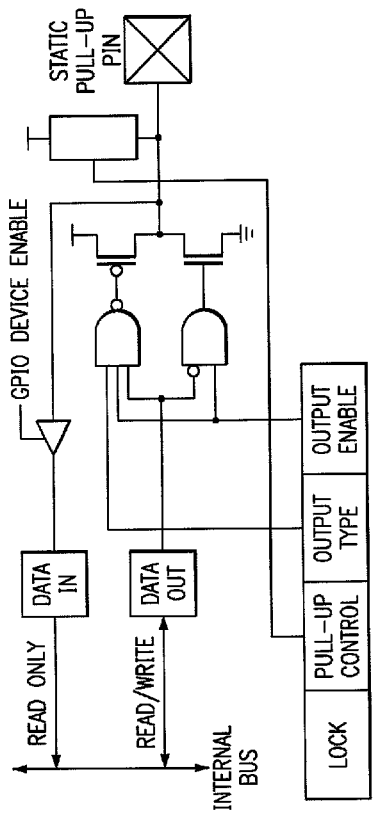
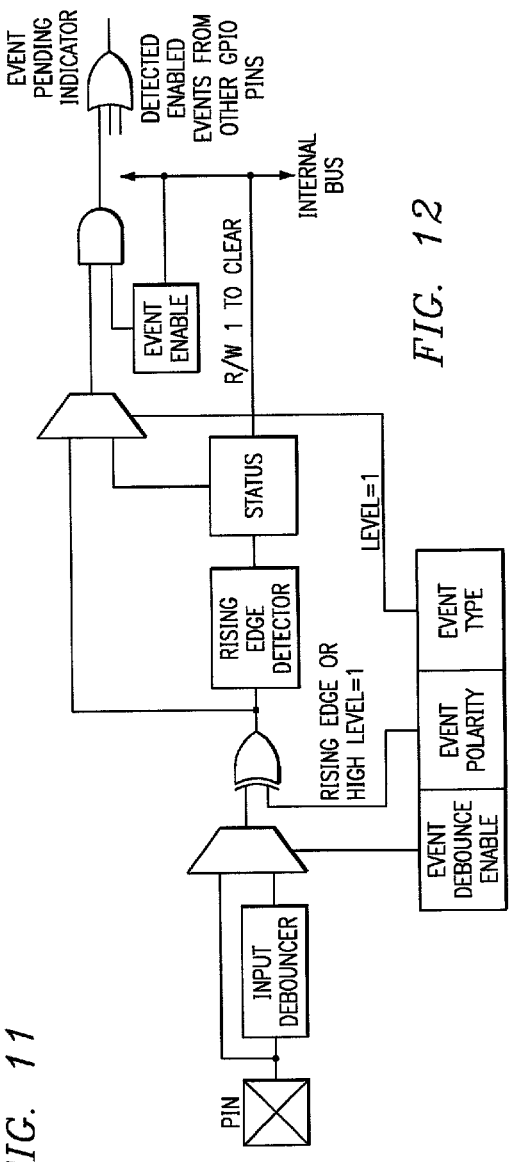

LOW PIN COUNT (LPC) I/O BRIDGE

TECHNICAL FIELD

This invention relates generally to computers, and more particularly to portable computing devices adapted to couple to docking stations and port replicators.

BACKGROUND

Computers have evolved from early system designs that required large amounts of space and occupied entire rooms, to desk-top personal computers that are smaller, faster and have more memory than their predecessors. More recent advancements in computers include the development of portable laptop and notebook computers, hand-held computing devices such as personal digital assistants (PDA's), and wearable computers, as examples.

Notebook-size and palm-size computers are typically battery powered for portable user applications. These smaller computers challenge the art in demands for conflicting goals of miniaturization, higher speed, performance, flexibility, and longer life between battery charges.

Often, it is desired to couple portable computers to peripherals in a desk-top environment, for example, when a corporate executive returns to the office from a business trip. The portable computer user may wish to connect to a larger monitor and keyboard, a local area network (LAN) and/or the Internet, printers, camera, and speakers, as examples. The user may also wish to connect the portable computer to another computer such as a desk-top computer, a hard disk drive, or a floppy drive, for example. Some recent portable computer designs implement this connection upon return to the office by the use of docking stations and port replicators.

A docking station 112, shown in FIG. 1, is a desktop accessory adapted to couple a portable computer 110 such as a notebook computer to other computing devices such as mouse 118, full size monitor 114, full size keyboard 120, as examples. Docking station 112 includes a slot 116 for receiving the portable computer 110.

FIG. 2 shows a back view of a notebook computer 110. Portable computer 110 includes a plurality of connectors, for legacy port interfaces 120 122, 124, 126, and 128 which may be for coupling the portable computer 110 to a printer, mouse, external keyboard, monitor, other drives or computers, USB, Ethernet, and other ports, as examples. Notebook computer 110 includes a connector 130 for coupling to a docking station 112 or port replicator. Connector 130 includes a large number of pins, e.g., 200 to 400 pins. Connector 130 is adapted to carry signals and transmit I/O data between the docking station 112 and the portable computer 110.

A port replicator 232 is another type of portable computer peripheral accessory, shown in FIG. 3. A user can leave a printer, mouse, full-size monitor and other peripherals connected to the port replicator 232, and quickly connect to these peripherals by engaging the portable computer 210 with the port replicator 232. As with a docking station 112, a port replicator 232 also requires a large-pin-count connector on the port replicator 232 and portable computer 210, to transfer information between the port replicator 232 and the portable computer 110.

A problem with prior art portable computers is that a large connector 130 is required to handle the large number of signals when coupling to a docking station or port replicator. The connectors 130 used today have a high pin count, e.g. 200 to 400 pins, and require a large amount of space. These connectors 130 are expensive from a cost and real-estate standpoint. Furthermore, the more pins a connector has, the more likely it is that a pin will get bent or become damaged, requiring replacement, or even the replacement of the portable computer, docking station or port replicator.

What is needed in the art is a docking solution having a smaller pin count connector than in prior art portable computing systems.

SUMMARY OF THE INVENTION

Embodiments of the present invention provide a small-pin-count docking solution by providing a low pin count (LPC) input/output (I/O) bridge device including logic adapted to detect whether a portable computer is docked, and if so, send data serially over a low-pin-count connector. If the portable computer is not docked, data is transmitted in a traditional (legacy) fashion over legacy ports.

Disclosed is a LPC I/O bridge device, including a plurality of parallel input ports coupleable to an I/O bus, an LPC controller coupled to the parallel input ports and coupleable to an LPC interface, and a serial output port and a plurality of parallel output ports coupled to the LPC controller. Serialization logic is coupled to the LPC controller and serial output port adapted to serialize the data transmissions. The LPC controller is adapted to receive information on one of the input ports, examine the information, and determine whether to route data transmissions from the I/O bus to the serial output port, parallel output ports, or both.

Also disclosed is a portable computer including a plurality of I/O ports and a LPC I/O bridge device coupled to an I/O bus, and a docking connector coupled to the LPC I/O bridge device. The LPC I/O bridge device includes an LPC controller coupled to the I/O bus and docking connector adapted to detect whether the portable computer is coupled to a docking station via the docking connector and route data transmissions from the I/O bus to the I/O ports, docking connector, or both, and serialization logic coupled to the LPC controller adapted to serialize the data transmissions routed to the docking connector.

Further disclosed is a docking station for a portable computer, the docking station including a docking connector adapted to receive serial data transmissions, the docking connector having less than 200 pins, and a LPC I/O bridge device. The LPC I/O bridge device includes an LPC controller coupled to the docking connector adapted to route serial data transmissions, and serialization logic coupled to the LPC controller adapted to serialize the data transmissions routed to the docking connector.

Also disclosed is a docking system, including a portable computer having a plurality of I/O ports and a LPC I/O bridge device coupled to an I/O bus, and a docking connector coupled to the LPC I/O bridge device, and a docking station coupleable to the docking connector. The portable computer LPC I/O bridge device includes an LPC controller coupled to the I/O bus and docking connector adapted to detect whether the portable computer is coupled to a docking station via the docking connector and route data transmissions from the I/O bus to the I/O ports, docking connector, or both. The portable computer LPC I/O bridge device also includes serialization logic coupled to the LPC controller adapted to serialize the data transmissions routed to the docking connector. The docking station is adapted to receive the serialized data transmissions from the LPC I/O bridge device through the portable computer docking connector.

Further disclosed is a method of bridging I/O data transmissions between a portable computer and a docking station using a docking connector, the portable computer having a plurality of legacy ports coupled to an I/O bus, a LPC I/O bridge device coupled to the I/O bus, and a docking connector coupled to the LPC I/O bridge device. The method includes detecting whether the portable computer is coupled to the docking station via the docking connector, receiving information from an LPC interface, and determining from the LPC interface information whether to route data transmissions from the I/O bus to the legacy ports, docking connector, or both. The method also includes serializing data transmissions to be routed to the docking connector, and routing data transmissions as determined.

Advantages of embodiments of the present invention include the ability use a docking connector having significantly fewer pins than in the prior art, which provides a cost-savings and reduces the likelihood of connector damage. A smaller amount of physical space is required on the portable computer for the docking connection. Platform hardware and software changes are not required because the I/O protocol serialization is transparent to the portable computer. The LPC I/O bridge device eliminates compatibility concerns associated with legacy port replication.

BRIEF DESCRIPTION OF THE DRAWINGS

The above features of embodiments of the present invention will be more clearly understood from consideration of the following descriptions in connection with accompanying drawings in which:

FIG. 11 illustrates a block diagram of a preferred embodiment of the GPIO basic functionality;

FIG. 12 shows a block diagram of a preferred embodiment for event detection by the GPIO ports;

FIG. 13 illustrates a block diagram of a preferred embodiment for the high speed serial interface;

Corresponding numerals and symbols in the different figures refer to corresponding parts unless otherwise indicated. The figures are drawn to clearly illustrate the relevant aspects of the preferred embodiments and are not necessarily drawn to scale.

DETAILED DESCRIPTION OF PREFERRED EMBODIMENTS

Figure 1:
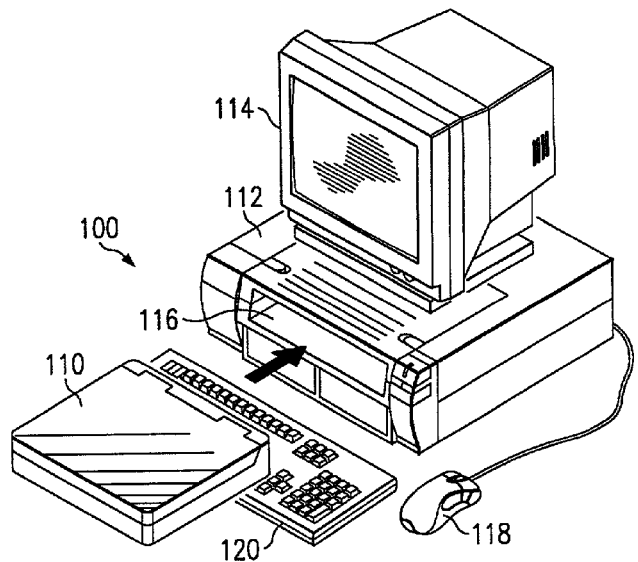
FIG. 1 illustrates a prior art portable computer and docking station.
Figure 2:
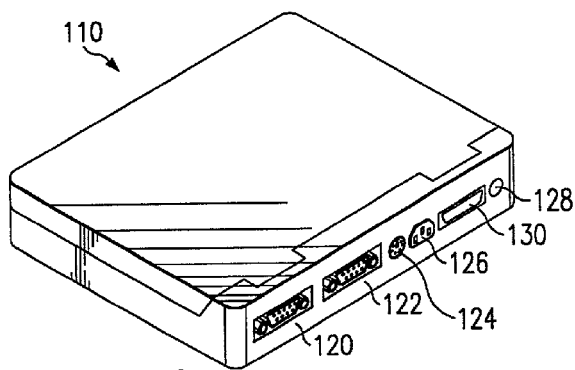
FIG. 2 shows a back view of a notebook computer having a large pin count connector for coupling to a docking station or port replicator.
Figure 3:
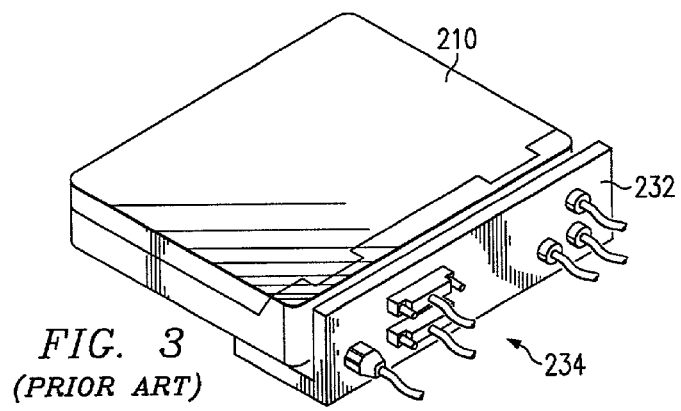
FIG. 3 illustrates a prior art port replicator.

A description of a prior art docking system and method will be described, followed by a description of some preferred embodiments of the present invention, and a discussion of some advantages thereof.

Several protocols exist for exchanging or transferring data and sharing data buses in portable computer applications. Some of these protocols include the System Management Bus (SM Bus) Specification, Version 2.0, Aug. 3, 2000, SBS Implementers Forum; the Audio Codec '97 specification, Revision 2.1, May 23, 1998, Intel Corporation; the Low Pin Count (LPC) Interface Specification, Revision 1.0, Sep. 29, 1997, Intel Corporation; and the Serialized IRQ Support for PCI Systems specification, Revision 6.0, Sep. 1, 1995, which protocols are incorporated herein by reference. The National Semiconductor Corporation PC87366 Datasheet, January 1999, is also incorporated herein by reference.

In U.S. Pat. No. 6,088,752, issued to Ahern, a docking system and method is described, including a first interface to couple between a first bus in a portable computer and a link, and a second interface adapted to couple between a second bus in a docking station and the link, where the first and second interfaces operate as a single bridge. The first and second interfaces of the docking system are operable to serially send information through the link in a different format from that of the first bus and the second bus, and allow the portable computer, through the first bus, to individually address the bus-compatible devices on the second bus using substantially the same type of addressing used to access devices on the first bus.

There are several problems presented with the docking system and method depicted in U.S. Pat. No. 6,088,752 ('752). First, port replicators do not include a PCI bus, and therefore the '752 isn't a viable solution for use with a port replicator. Second, two separate I/O's are required in the system. Custom drivers must be implemented to support legacy devices in the docking station, because the I/O address ranges and memory address ranges are different from those in the portable computer. A further problem is that switching is not addressed, which is problematic when both the serial interface and legacy ports are active. The serialization of the data is on the PCI side, not with the legacy ports.

Embodiments of the present invention achieve technical advantages as a Low Pin Count (LPC) I/O bridge device or superlink in which the I/O management function resides entirely in the portable computer. This "superlink" or "super I/O" serializes data transmission in a way that is transparent to external devices. The super I/O is adapted to intelligently switch ports, based on whether or not the portable computer is docked or not. The super I/O handles the packetization of serial data and sends it to a chip operating in a mode that reproduces the ports of the port replicator. The super I/O includes a low-pin count (LPC) controller that acts as a bridge between the LPC interface and the internal bus.

Figure 4A:
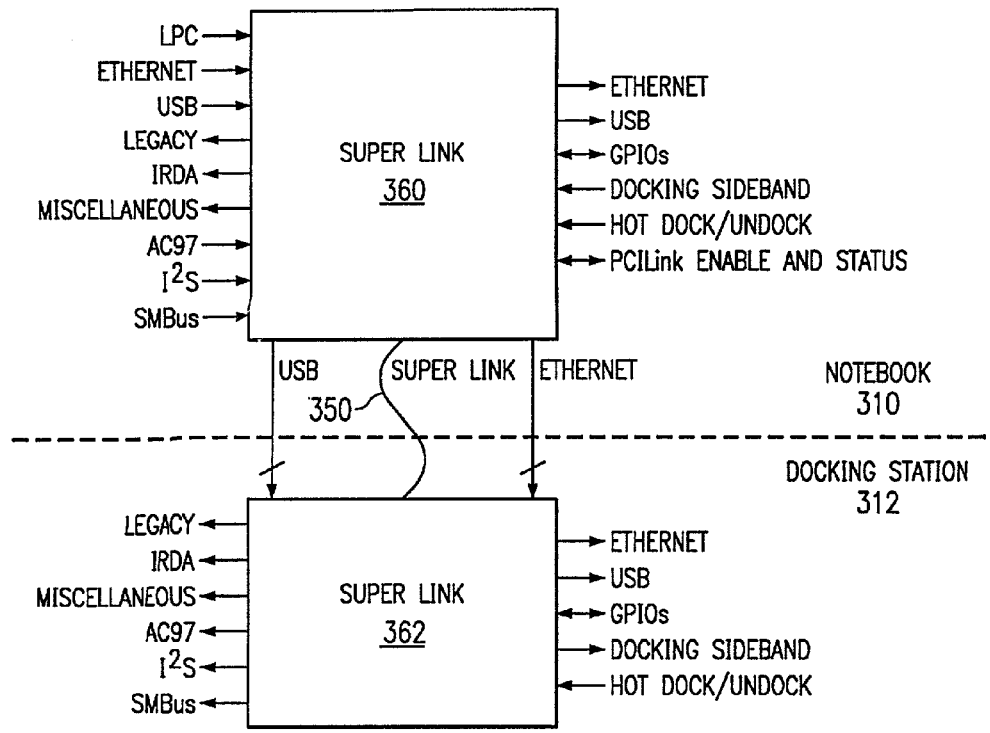
FIG. 4A is a block diagram of the LPC I/O bridge superlink notebook/docking station communication interface.

FIG. 4A is a block diagram of the LPC I/O bridge superlink notebook/docking station communication interface in accordance with a preferred embodiment of the present invention. A portable computer 310 comprising, e.g. a notebook computer that includes a LPC I/O bridge device or superlink function 360 is coupled via a superlink interface 350 to a peripheral device 312 such as a docking station, port replicator or expansion chassis having a LPC I/O bridge device or superlink function 362. The term "superlink" as used herein is interchangeable with the term "LPC I/O bridge device".

The portable computer 310 superlink function 360 is adapted to handle a plurality of different types of data exchange, e.g., LPC, Ethernet, USB, legacy (mouse, printer, audio, etc.), IRDA, AC-97, I²S, SMBus, GPIO's, Docking Sideband, hot dock/undock. A PCI link enable and status function is included. Advantageously, the LPC I/O bridge device 360 is adapted to serialize data transmission of a plurality of protocols, such as legacy I/O protocols, keyboard controller, mouse controller, PS2, AT keyboard, parallel, serial, GPIO's, AC-link, SMBus, SPDIF/Audio, and LPC bus, as examples.

The docking station 312 superlink function 362 is adapted to receive signals from the superlink function 360 of the portable computer 310. In accordance with embodiments of the present invention, the superlink functions 360 and 362 comprise single integrated circuits located at the portable computer 310 and docking station 312, respectively. The superlink functions 360/362 are adapted to handle data transmission in a serial interface, which reduces the number of pins requires on the physical connector between the portable computer 310 and docking station 312.

Figure 4B:
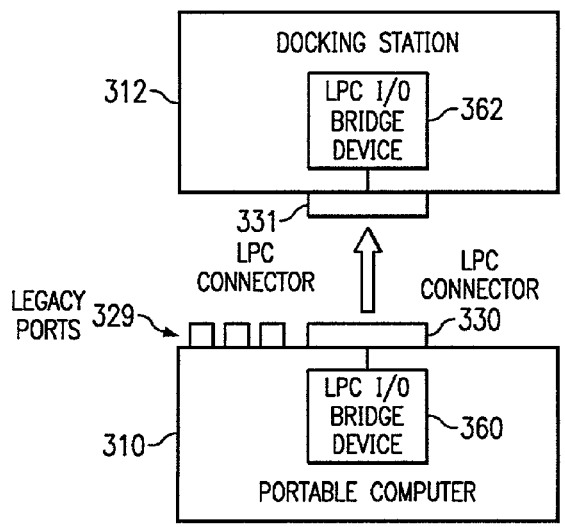
FIG. 4B is a block diagram of a portable computer and docking station in accordance with an embodiment of the present invention.

FIG. 4B is a block diagram of a portable computer 310 and docking station 312 in accordance with an embodiment of the present invention. Portable computer 310 includes LPC I/O bridge device 360 and an LPC connector 330. Preferably, LPC connector has 200 pins or less, and more preferably, LPC connector 330 has 10 pins or less. For example, a 4 pin connector may be used for LPC connector 330. Docking station 312 includes LPC I/O bridge device 362 and includes an LPC connector 331 that is adapted to mate with LPC connector 330 on the portable computer 310.

Figure 5:
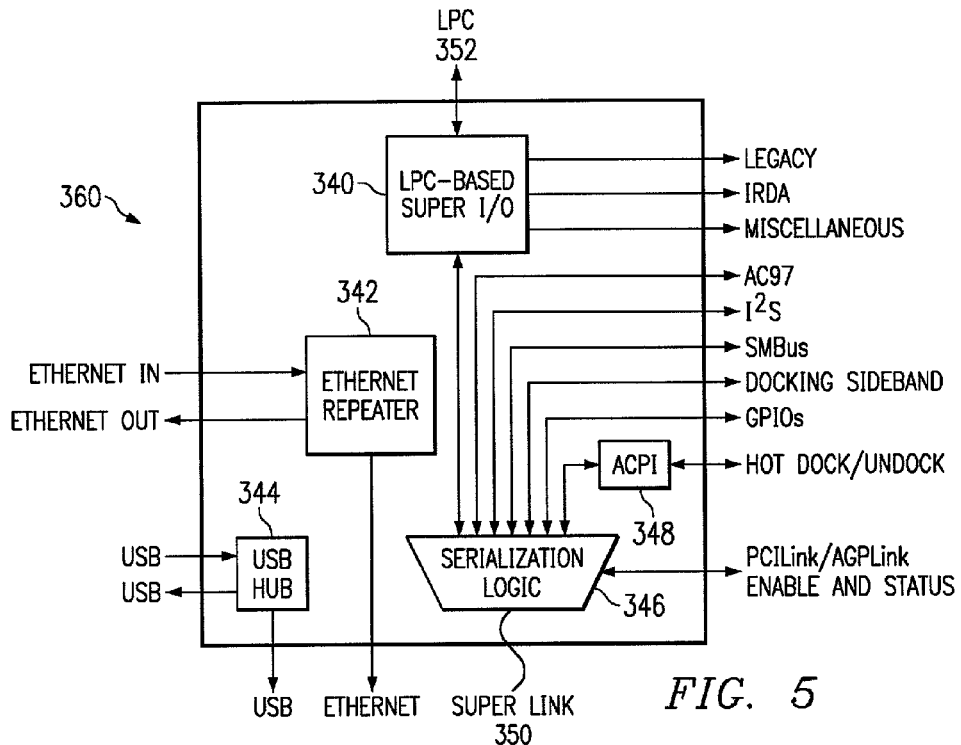
FIG. 5 shows a high level block diagram of an embodiment of the superlink function or LPC I/O device.

FIG. 5 shows a high level block diagram of the superlink function or LPC I/O device 360 for a portable computer in accordance with an embodiment of the present super I/O invention. Superlink function 360 includes a LPC-based super I/O function or controller 340 that is adapted to receive LPC information 352. Superlink function 360 is capable of detecting whether the portable computer is coupled to a docking station via the docking connector and to route data transmissions from the I/O bus to the legacy ports, docking connector, or both. LPC-based super I/O function 340 is coupled to serialization logic 346 that is adapted to receive a plurality of different types of signals and convert them to signals in a serial format, which serial signals can then be transmitted over a superlink 350 interface. The superlink function 360 also includes an Ethernet repeater 342 and USB hub 344.

Figure 6:
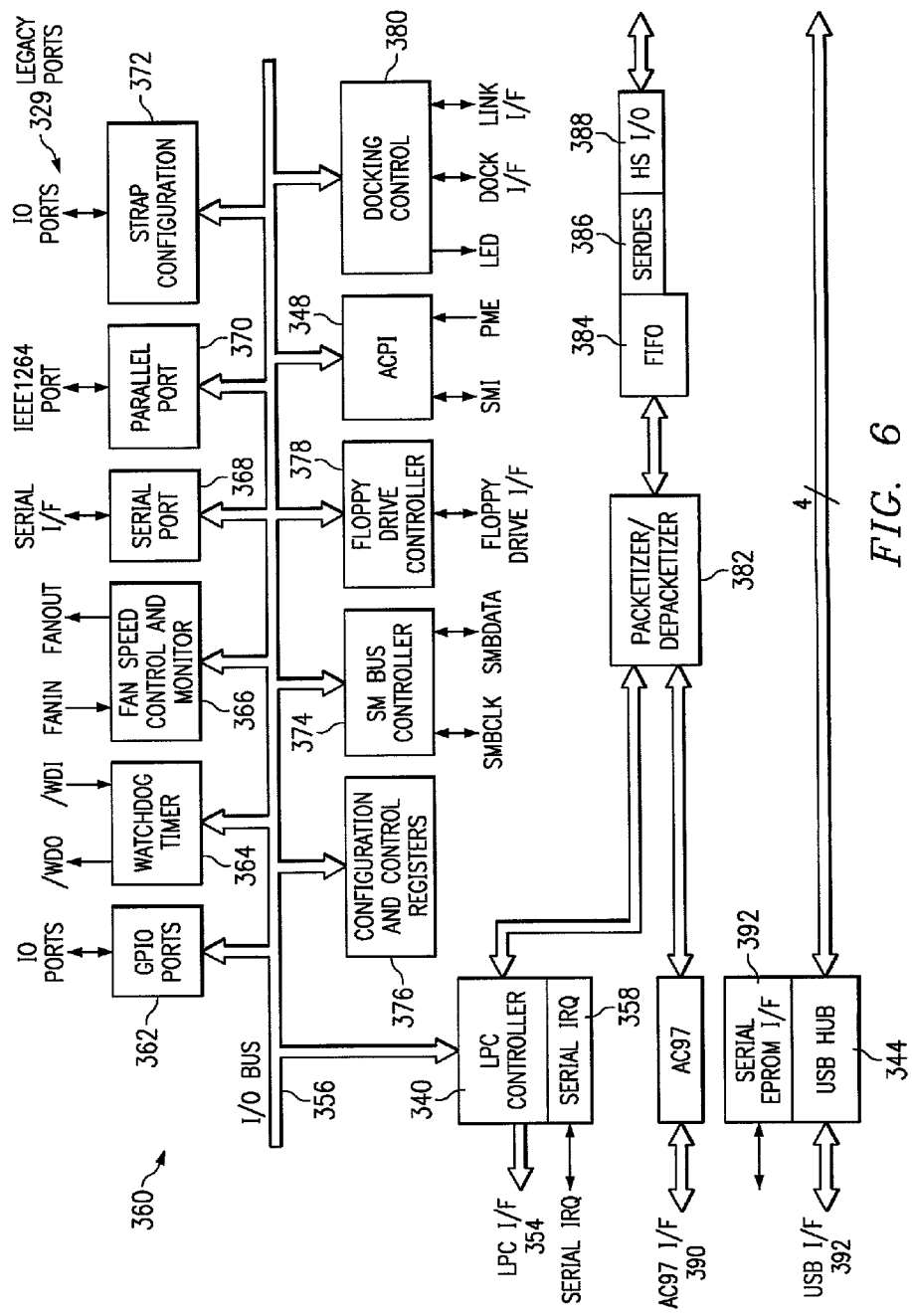
FIG. 6 illustrates a more detailed block diagram of an embodiment of the present LPC I/O bridge device.

FIG. 6 illustrates a more detailed block diagram of an embodiment of the present LPC I/O bridge device 360. The LPC-based super I/O function 340 includes a serial interface 358 and is coupled to I/O bus 356. I/O bus 356 is coupled to a plurality of GPIO ports 362, e.g., 32, with event notification, fan speed and control 366, e.g., for two fans, a watchdog timer 364, SMBus controller 374, system wakeup control (not shown), parallel port 370 such as IEEE 1284, a serial port 368, a floppy disk controller 378, serial IRQ interface 358, docking control 380. LPC I/O bridge device also includes an AC97 interface 390 and a USB hub 344. A packetizer/depacketizer 382 adapted to packetize and depacketize serialized data is coupled to LPC controller 340 and AC97 390, as shown. Preferably, an advanced CMOS process is used to achieve low systempower consumption. The device 360 may also include configuration and control registers 376, FIFO 384, serdes The LPC-based super I/O function or controller 340 may include a plurality of features, including ACPI 348 with supported wake events for ring indicate, fan tachometer, GPIO, dock and undock events and including automatic power down for serial port, parallel port and FDC. ACPI 348 is adapted to support SMI (legacy). Serial IRQ 358 supports active and quiet modes, is fixed to 21 frames, and has no external parallel IRQ. SMBus 374 is preferably slave function only and preferably has access to global register set. Fan speed and control monitor 366 may support e.g., two fan control and monitor units, with the fan speed control being a programmable PWM generator. A floppy drive controller 378 is included, as well as 32 GPIO ports 362, each port including event detection and notification, with 8 ports powered by VSB providing event notification and wake-up. Watchdog timer 364 looks for four maskable system events. An LPC Interface 354 and AC'97 Interface 390 with support for two codecs, for example, are included, as well as serial EPROM Interface 392 and a 4 port USB Hub 344 are also included.

The LPC I/O bridge device 360 comprises a plurality of logical devices, a host interface and a central set of configuration registers, each coupled to and built around an internal bus architecture. The LPC Controller 340 preferably comprises a logic chip and functions to serve as a bridge between the external LPC interface 354 and the internal bus 356. The LPC controller 340 preferably is adapted to support 8 bit I/O read, 8 bit I/O write and 8 bit direct memory access (DMA) transactions on the LPC bus, as examples.

General preferences regarding aspects of embodiments of the present invention will next be described, with reference to FIG. 4B, FIG. 5 and FIG. 6. The LPC I/O bridge device 360 is preferably implemented in a portable computer 310 having a plurality of legacy ports 329 coupled to an I/O bus 356 and a docking connector 330. The device 360 includes an LPC controller 340 coupled to the I/O bus 356 and docking connector 330, where the LPC controller 340 is adapted to detect whether the portable computer 310 is coupled to a docking station 312 via the docking connector 330 and route data transmissions from the I/O bus 356 to the legacy ports 329, docking connector 330, or both. Serialization logic 346 is coupled to the LPC controller 340, wherein the serialization logic 346 is adapted to serialize the data transmissions routed to the docking connector 330. The LPC controller 340 is coupled to LPC interface 354, wherein routing decisions are based on information received on the LPC interface 354, such as, the type of data and address information received from the BIOS or operating system. Preferably, at least the LPC controller 340 and serialization logic 346 reside on a single integrated circuit.

The portable computer 310 may comprise a variety of portable computers such as a notebook or laptop computer, PDA, or wearable computer. The docking station 312 adapted to receive the serialized data transmissions from the LPC I/O bridge device 360 through the portable computer docking connector 330. Preferably, the docking station 312 includes a single integrated circuit 362 adapted to control the receipt of the serialized data transmission. The docking station may comprise a docking station such as the one shown in FIG. 1, a port replicator or expansion chassis, as examples.

More specific details of preferred embodiments will next be described, without limiting the invention to the examples provided. There are alternative methods of implementing embodiments of the invention than those described below.

In a preferred embodiment, the configuration structure preferably comprises a set of banked registers which may be accessed via a pair of specialized registers. Access to the device configuration registers may be made preferably through an index data register pair, using two system I/O byte locations, as an example. The base address (BADDR) of this register pair is determined at reset, according to the state of the BADDR pin. Table 1 shows an example of possible selected base address as determined by BADDR, indicating BADDR strapping options.

TABLE 1

| BADDR | I/O ADDRESS | | |
|---|---|---|---|
| | Config Register | Index Register | Data Register |
| 0 | 2Eh | 2Eh | 2Fh |
| 1 | 4Eh | 4Eh | 4Fh |

The index register is located at the selected base address and is used as a pointer to the configuration register file. The index register holds the index of the configuration register that is currently accessible through the data register. Reading the index register returns the last value written to it. The data register is preferably a virtual register, and may be used as a data path to any configuration register. Accessing the data register actually accesses the configuration register that is currently pointed to by the Index register.

A preferred embodiment of the configuration of the LPC I/O bridge device 360 or superlink will next be described. Configuration of the superlink 360 is flexible and may be based on the configuration architecture implemented in typical Plug-and-Play components, for example. In a primary configuration address decoder, after a hard reset or Vdd Power On reset, the superlink 360 is preferably in a Run Mode with all logical devices disabled. The logical devices may be configured through two standard Configuration I/O Ports (INDEX and DATA) by placing the superlink 360 into Configuration Mode. The BIOS uses these configuration ports to initialize the logical devices at POST. The INDEX and DATA ports are preferably only valid when the superlink 360 is in Configuration Mode.

The device 360 enters the Configuration State when a particular Config Key is successfully written to the CONFIG REGISTER. When in configuration mode, all logical devices function properly. Entering and exiting configuration mode has no effect on the devices.

The device 360 exits the Configuration State when a particular Config Key is successfully written to the CONFIG REGISTER.

To program the configuration registers, the following configuration sequence is followed: enter configuration mode, configure the configuration registers, and exit configuration mode. The system sets the logical device information and activates desired logical devices through the INDEX and DATA Registers. When in the configuration mode, the INDEX REGISTER may be located at the CONFIG REGISTER address and the DATA REGISTER may be located at INDEX REGISTER address +1. The desired configuration registers are accessed by writing the index of the Logical Device Number Configuration Register to the INDEX REGISTER and then writing the number of the desired logical device to the DATA REGISTER. Then, the address of the desired configuration register within the logical device is written to the INDEX REGISTER, and then the configuration register is written or read through the DATA REGISTER. However, if accessing the Global Configuration Registers, the first step is not required.

When not in the configuration mode, the super I/O chip 360 returns to the RUN State. Preferably, only two states are defined (Run and Configuration). In the Run State, the chip will preferably always be ready to enter the Configuration State.

Figure 7:
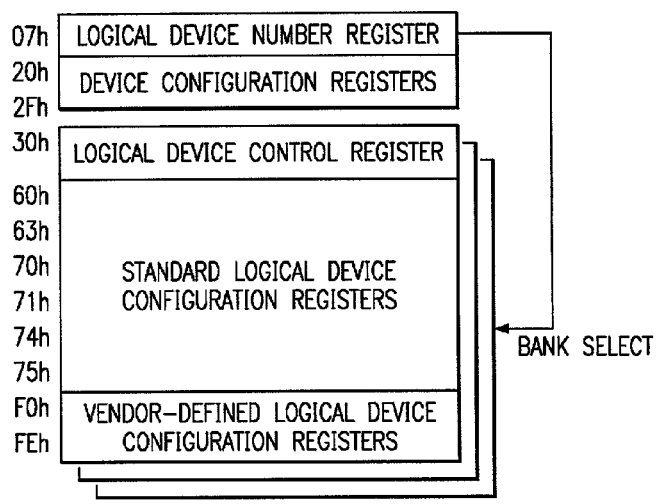
FIG. 7 shows an example of a structure for a standard configuration register file.

A preferred embodiment of the banked logical device registers structure will next be described. Each functional block shown in FIG. 6 is preferably associated with a Logical Device Number (LDN). The configuration registers are grouped into banks, where each bank holds the standard configuration registers of the corresponding logical device. An example of a structure for the standard configuration register file is shown in FIG. 7. Preferably, the superlink 360 control and configuration registers 376 are not banked and are accessed by the index-data register pair only, preferably. Each logical device has its own bank configuration and control register that is accessed by the LDN register, which selects the bank, and the index register which selects the register within the bank. Table 2 shows an example of logical device number assignments for some of the functional blocks shown in FIG. 6.

TABLE 2

| LDN | Functional Block |
|---|---|
| 00h | Floppy Disk Controller (FDC) |
| 01h | Parallel Port (PP) |
| 02h | Serial Port 1 (SP1) |
| 03h | ACPI/System Wake-up Control (SWC) |
| 04h | General Purpose I/O (GPIO) Ports |
| 05h | Fan Speed Control and Monitor |
| 06h | Watchdog Timer (WDT) |
| 07h | Docking Control |
| 08h | High Speed Serial Interface |
| 09h | AC'97 Controller |

The superlink device 360 configuration registers may be located, for example, between 20h and 2Fh. When docked, these registers are mirrored in the device in the dock. Table 3 shows an example of standard control registers.

TABLE 3

| Index | Register Name | Description |
|---|---|---|
| 07h | Logical Device Number | This register selects the current logical device. See Table 2 for valid numbers. All other values are reserved. |
| 20h-2Fh | Superlink Configuration | Superlink configuration registers and ID registers. |

Preferably, the superlink device 360 includes a plurality of configuration registers 376. The configuration registers 376 are banked and selected by the value in the LDN register, with each device having its own register. An activation register is used to turn the devices on or off. Examples of such configuration registers 376 include registers for logical device activate, space configuration, interrupt configuration, and DMA configuration. Other configuration registers, include a primary device ID, secondary device ID, revision ID, and other registers. Registers may be implemented to control the pin function selects for the superlink device 360 and LED's.

In a preferred embodiment, a plurality of clocks are utilized in the device 360, e.g., a 100 khz clock for the SMBus, fan speed control clocks of 200 kHz, 24 MHz, 16 kHz, 8 kHz, 4 kHz, and 2 kHz, a 24.576 MHz AC'97 clock, a 62.5 MHz high speed serial interface clock, a 33 MHz LPC clock also SERIRQ, a 1 minute watchdog timer, and a 48 MHz USB Clock, as examples.

A preferred embodiment of the Advanced Configuration and power Interface (ACPI) of the superlink 360 will next be described. Power management is a very key concern for portable computers such as notebooks. There are two methods of controlling power in notebooks today, legacy mode (SMI based) and ACPI mode (SCI based). Power Management in legacy mode is typically handled through the BIOS. The BIOS monitors device activity and through the use of timers will power down inactive devices. Legacy mode of power management does an adequate job of managing devices that are static and for devices the BIOS is aware of. But for dynamic devices which the BIOS is not aware of, legacy mode does not work as well. Various companies have defined ACPI to replace legacy mode. The main difference between legacy mode and ACPI is that power management is handled through the operating system in ACPI mode instead of the BIOS. Because the operating system (OS) understands the resources required by each device and of the entire system itself, the OS is better able to manage power.

Preferably, the superlink 360 supports both legacy mode and ACPI. The reason why both will be supported is because many operating systems do not support ACPI and to function in these operating systems legacy is required.

There are several sources of wake. When the operating system or BIOS (depending whether the system is ACPI or legacy) places devices or the system into low power states, there will be times when the device or system needs to be brought out of a low power state so a particular event can be serviced. Table 4 lists examples of wake events supported by superlink 360 in a preferred embodiment.

TABLE 4

| Wake Event | Source of Wake | Description |
|---|---|---|
| Ring Indicate 1 | Serial Port 1 (COM1) | High to low transitions indicate a detection of ring in a external modem connected to serial port 1 (COM1). |
| Fan Tachometer 1 | Fan Motor1 | The fan speed drops below a predetermined value. |
| Fan Tachometer 2 | Fan Motor2 | The fan speed drops below a predetermined value. |
| General Purpose Event | GPIO[0 . . . x] | These general purpose events can be used for almost anything desired by the platform designer. For example, it could be used to connect to the Lid of the notebook to notify the system of when the Lid is open or closed. |
| Interrupts | Parallel Port, Serial Port | Interrupt from a parallel port or a serial port. |
| Dock Event | | A dock event occurs when there is a physical link between the primary superlink node and the secondary superlink node. |
| Undock Event | | A undock event occurs when the physical link between the primary superlink node and the secondary superlink node can no longer be established. |

When a wake event occurs on the secondary device, a method is needed to alert the operating system or BIOS to bring the system out of a low power state. Pins PME__IN and SMI__IN are used to do this. The /PME and /SMI pins of the secondary device are routed through the dock connector to the PME__IN and SMI__IN pins in the primary device. When a wake event occurs on the secondary device it is configured to generate a /PME or /SMI. This is detected by the PME__IN or SMI__IN pin on the primary device which updates the appropriate PME or SMI Global status register bit and asserts the /PME or /SMI pin.

Superlink 360 is preferably adapted to power down the serial ports and the parallel port when there is no activity (automatically) or when commanded to power down a particular device (manually). For example, the transmitter (TX) for a serial port will be automatically powered down under the following conditions: a Intelligent PM of the serial port is enabled, and the TX buffer and shift register are empty. In this case, the transmitter will exit the power down state on a write to the TX buffer. The receiver (RX) for the serial port will be automatically power down under the following conditions: the Intelligent PM of the serial port is enabled, RX FIFO is empty and RX is waiting for a start bit. In this case, the receiver will exit the power down state when a RXDx pin changes state. The ECP logic of the parallel port will be automatically powered down under the following conditions: the Intelligent PM of the parallel port is enabled, ECP is not enabled in the configuration registers, and SPP, PS/2 Parallel port or EPP mode is selected through ECR while in ECP mode. The EPP logic of the parallel port will be automatically powered down under the following conditions the intelligent PM of the parallel port is enabled, EPP is not enabled in the configuration registers, and EPP is not selected through ECR while in ECP mode. The parallel port logic can exit power down modes when the ECP mode is changed through the ECR register or when the parallel port mode is changed through the configuration registers. The Floppy Drive Controller 378 logic will be automatically powered down when the intelligent PM of the FDC port is enabled.

The serial port and parallel port may be manually powered down by setting the appropriate bit in the Logical Device Activate Register. Software can bring the serial port and/or the parallel port out of a power down state by clearing the appropriate bit in the Logical Device Activate Register.

PME Wake Status and Enable registers may be used to indicate what event generated the PME#. An example of a wake event is when a ring occurs while the serial port is in a low power state. A global PME status register may be used to indicate the state of the sum of all of the individual PME event sources. A global PME enable register may be used to enable/disable the global PME event source. A plurality of PME wake status register may be used to indicates the state of each of the individual PME event sources. A plurality of PME wake enable registers may be used to enable/disable each of the individual PME event sources.

A preferred embodiment for System Management Interrupt (SMI) status and enable registers will next be described. The SMI is a non-maskable interrupt with the highest priority level used for OS transparent power management. The SMI output is asserted whenever one or more SMI interrupt events is enabled by the appropriate SMI Enable Register. The SMI can be routed to the serial IRQ stream. The assertion of SMI can be programmed to be active high or active low as well as programmable between push-pull or open-drain output. The SMI pin defaults to active low, open-drain output.

A plurality of SMI status registers is preferably included, each register indicating the state of each of the individual SMI event sources. The bits in these register are set regardless of the state of the corresponding enable bit, and all the bits in these registers must be cleared at the source. A plurality of SMI enable registers are also included, the SMI enable registers being used to enable each of the individual interrupt sources onto the SMI output.

A preferred embodiment for the serial IRQ 358 will next be described. The serial IRQ is preferably a wired-OR structure that passes the state of the devices IRQ's to a host controller. When docked the SERIRQ pin is not used in the secondary device. Preferably, only the primary device serial IRQ controller is active. When docked the secondary controller responds to interrupts from the devices in the secondary device by sending the interrupt number of the device to the primary controller.

When the superlink device 360 is in the dock mode and a device generates an interrupt, the SERIRQ controller generates a command indicating the interrupt number generated and sends it to the packet engine. The primary device sets the appropriate status register and waits for the start of the frame.

When the superlink 360 is on the motherboard and a device generates an interrupt, the SERIRQ controller sets the status register and waits for the start of the frame. When an interrupt is cleared the interrupt service routine writes a 1 to the status register clearing it. If the device generating the interrupt is on the dock then the SERIRQ controller generates a clear interrupt command to the packet engine. Upon receiving a clear interrupt command from the primary side, the secondary device then clears its status register.

The SERIRQ protocol preferably uses the LPC (PCI) clock as its clock source and conforms to the PCI Bus specification. All SERIRQ agents must drive/sample SERIRQ synchronously related to the rising edge of the PCI bus clock. The protocol uses a serial packet comprising one start frame, several IRQ/data frames, and one stop frame. The start frame pulse may be, e.g., four to eight clocks wide. There are two modes of operation for the SERIRQ start frame—Quiet (Active) mode and Continuous (Idle) mode.

In the Quiet (Active) Mode, any device may initiate a Start Frame by driving the SERIRQ low for one clock, while the SERIRQ is Idle. After driving low for one clock the SERIRQ must immediately be tri-stated without at any time driving high. A Start Frame may not be initiated while the SERIRQ is Active. The SERIRQ is Idle between Stop and Start Frames. The SERIRQ is Active between Start and Stop Frames. This mode of operation allows the SERIRQ to be Idle when there are no IRQ/Data transitions which should be most of the time.

Once a Start Frame has been initiated, the Host Controller will take over driving the SERIRQ low in the next clock and will continue driving the SERIRQ low for a programmable period of three to seven clocks more. This makes a total low pulse width of four to eight clocks. Finally, the Host Controller will drive the SERIRQ back high for one clock, then tri-state.

Any SERIRQ Device which detects any transition on an IRQ/Data line for which it is responsible must initiate a Start Frame in order to update the Host Controller unless the SERIRQ is already in an SERIRQ Cycle and the IRQ/Data transition can be delivered in that SERIRQ Cycle.

In the Continuous (Idle) Mode, preferably only the Host controller can initiate a Start Frame to update IRQ/Data line information. All other SERIRQ agents become passive and may not initiate a Start Frame. SERIRQ will be driven low for four to eight clocks by Host Controller. This mode has two functions. It can be used to stop or idle the SERIRQ or the Host Controller can operate SERIRQ in a continuous mode by initiating a Start Frame at the end of every Stop Frame.

An SERIRQ mode transition can preferably only occur during the Stop Frame. Upon reset, SERIRQ bus is defaulted to Continuous mode, therefore preferably only the Host controller can initiate the first Start Frame. Slaves must continuously sample the Stop Frames pulse width to determine the next SERIRQ Cycle's mode.

A preferred embodiment for an IRQ/data frame will next be described. The SERIRQ is designed to decode a fixed length of 17 IRQ/data frames that are sampled in the following sequence: IRQ0, IRQ1, SMI, IRQ3 through IRQ15.

Once a Start Frame has been initiated, all SERIRQ Devices must watch for the rising edge of the Start Pulse and start counting IRQ/Data Frames from there. Each IRQ/Data Frame is three clocks: Sample phase, Recovery phase, and Turn-around phase. During the Sample phase the SERIRQ Device must drive the SERIRQ low, if and only if, its last detected IRQ/Data value was low. If its detected IRQ/Data value is high, SERIRQ must be left tri-stated. During the Recovery phase, the SERIRQ Device must drive the SERIRQ high, if and only if, it had driven the SERIRQ low during the previous Sample Phase. During the Turn-around Phase all SERIRQ Devices must be tri-stated. All SERIRQ Devices must drive the SERIRQ line low at the appropriate sample point if its associated IRQ/Data line is low, regardless of which device initiated the Start Frame.

The Sample Phase for each IRQ/Data follows the low to high transition of the Start Frame pulse by a number of clocks equal to the IRQ/Data Frame times three, minus one. (e.g. The IRQ5 Sample clock is the sixth IRQ/Data Frame, (6×3)−1= 17th clock after the rising edge of the Start Pulse.) So, the numbers of clocks past Start Frame for IRQ/Data Frame 1 to 17 will be 2, 5, 8, . . . 44, 47, 50. At the end of each Sample phase, the Host Controller will sample the state of the SERIRQ line and replicate the status of the original IRQ/Data line at the input to its Interrupt Controller (8259, normally).

Once all IRQ/Data Frames have completed, the Host Controller will terminate SERIRQ activity by initiating a Stop Frame. Preferably, only the Host Controller can initiate the Stop Frame. All SERIRQ devices must decode the STOP Frame to terminate SERIRQ Cycle sampling. A Stop Frame is indicated when the SERIRQ is low for two (the next SERIRQ Cycle is the Quiet mode) or three (the next SERIRQ Cycle is the Continuous mode) clocks.

There may be none, one or more Idle states during the Stop Frame. The next SERIRQ Cycle's Start Frame pulse may or may not start immediately after the turn-around clock of the Stop Frame.

Figure 8:
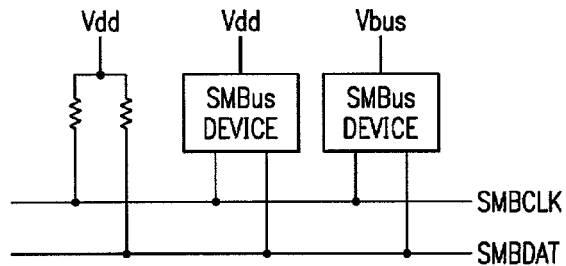
FIG. 8 shows an SMBus Topology.

A preferred embodiment of the SM Bus Controller 374 will next be described. A preferred SMBus Topology is shown in FIG. 8. The System Management Bus (SMBus) is a two-wire interface through which various system component chips can communicate with each other and with the rest of the system. It is based on the principles of operation of I²C. The SMBus provides a control bus for system and power management related tasks. A system may use SMBus to pass messages to and from devices instead of tripping individual control lines. Removing the individual control lines reduces pin count. Accepting messages ensures future expandability.

The SMBus allows easy interfacing to a wide range of low-cost memories and I/O devices, including EPROMs, SRAMs, timers, ADC, DAC, clock chips and peripheral devices. With System Management Bus, a device can provide manufacturer information, tell the system what its model/part number is, save its state for a suspend event, report different types of errors, accept control parameters, and return its status.

The SMBus specification refers to three types of devices. A slave is a device that is receiving or responding to a command. A master is a device that issues commands, generates clocks, and terminates transfers. A host is a specialized master and must support the SMBus host notify protocol.

The superlink device 360 acts as a slave on the SMBus. When the device is in slave mode it responds to any command that matches the slave address in its slave address lookup table. Access to the SMBus registers can be done preferably only through the SMBus interface. Preferably, only the registers defined for the SMBus can be accessed through the SMBus interface.

Preferably, the SMBus is a two-wire bus. Multiple devices, both bus masters and bus slaves, may be connected to an SMBus segment. Generally, a bus master device initiates a bus transfer between it and a single bus slave and provides the clock signals. The one exception to this rule is during initial bus setup when a single master may initiate transactions with multiple slaves simultaneously. A bus slave device can receive data provided by the master or it can provide data to the master.

Preferably, only one device may master the bus at any time. Since more than one device may attempt to take control of the bus as a master, SMBus provides an arbitration mechanism that relies on the wired-AND connection of all SMBus device interfaces to the SMBus.

The clock and data signals are open-drain signals. To enable the bus a pull up is required. The minimum clock frequency is 10 kHz and the maximum clock frequency is 100 kHz. The SMBus controller shall be designed to operate at the maximum clock frequency of 100 kHz.

A preferred embodiment of the data link layer will next be described. In data transactions, preferably, one data bit is transferred during each clock pulse. Data is sampled during the high state of the serial clock (SMBCLK). Consequently, throughout the clocks high period, the data should remain stable. Any changes on the SMBDAT line during the high state of the SMBCLK and in the middle of a transaction abort the current transaction. New data should be sent during the low clock cycle.

During each clock cycle, the slave can stall the master while it handles the received data or prepares new data. This can be done for each bit transferred, on a byte boundary, by the slave holding SMBCLK low to extend the clock-low period.

Each data transaction is composed of a START Condition, a number of byte transfers and a STOP Condition to terminate the transaction. Each byte is transferred with the most significant bit first, and after each byte, an Acknowledge signal must follow.

The bus master generates START and STOP Conditions. A high to low transition of the data line while the clock is high indicates a START condition. A low to high transition of the data line while the clock is high indicates a STOP condition.

The Acknowledge Cycle preferably comprises two signals: the ACK clock pulse sent by the master with each byte transferred, and the ACK signal sent by the receiving device. The master generates ACK the clock pulse on the clock pulse of the byte transfer. The transmitter releases the data line to allow the receiver to send the ACK signal. The receiver must pull down the data line during the ACK clock pulse, signaling that it has correctly received the last data byte and is ready to receive the next byte.

A receiver that wishes to NACK a byte must let the SMBDAT line remain high during the acknowledge clock pulse. An SMBus slave device may decide to NACK a byte other than the address byte in the following situations: first, the slave device is busy performing a real time task, or data requested is not available; second, the slave device detects an invalid command or invalid data; and third, if a master-receiver is involved in the transaction, it must signal the end of data to the slave transmitter by generating a NACK on the last byte that was clocked out by the slave.

Each device on the bus has a unique address. Before any data is transmitted, the master transmits the address of the slave being addressed. The slave device sends an acknowledge signal on the data line once it recognizes its address. An SMBus device must preferably always acknowledge its own address.

A preferred embodiment for synchronization on the SMBus will next be described. All masters generate their own clock on the SMBCLK line to transfer messages. Preferably, data is valid only during the high period of the clock. A defined clock is therefore needed for the bit-by-bit arbitration procedure to take place.

A high-to-low transition on the SMBCLK will cause all devices involved to start counting off their low period and start driving SMBCLK low if the device is a master. As soon as the device finished counting its low period it will release the SMBCLK line. However, the low-to-high transition of the clock may not change state if another master with a longer low period keeps the SMBCLK line low. In this situation the master that released the SMBCLK line will enter the WMBCLK high wait period. When all devices have counted off their low period the SMBCLK line will be released and go high. The first device that completes the high period count will pull the SMBCLK line low and the cycle will start again.

A preferred embodiment for clock low extending will next be described. SMBus provides a clock synchronization mechanism to allow devices of different speeds to co-exist on the bus. In addition to the bus arbitration procedure the clock synchronization mechanism can be used during a bit or byte transfer in order to allow a slower slave devices to cope with faster masters.

Devices are allowed to stretch the clock during the transfer of one message up to the maximum limits in the AC specification of the SMBus. Clock LOW extension may occur during any bit transfer including the clock provided prior to the ACK clock pulse. A slave device may select to stretch the clock LOW period between byte transfers on the bus in order to process received data or prepare for data transmission.

A preferred embodiment for the SMBbus Packet protocol will next be described. The SMBus preferably supports up to 4 packet protocols (Send Byte, Receive Byte, Write Byte/Word, and Read Byte/Word) without a Packet Error Code (PEC). The Send and Receive Bytes are used in the following manner. When it is sensed there is no command used in either Send and Receive Byte protocol, superlink 360 will preferably always receive or provide data from the address pointed to by an internal address pointer. The superlink 360 will not change that address unless told to by either the Write Byte/Word or Read Byte/Word protocol. The command code is an address. The superlink 360 supports up to 256 address or command codes.

A preferred embodiment for a SMBus address resolution protocol is next described. SMBus slave address conflicts can be resolved by dynamically assigning a new unique address to each slave device. The Address Resolution Protocol (ARP) possesses the following attributes: address assignment utilizes the standard SMBus physical layer arbitration mechanism, assigned addresses remain constant while device power is applied, and address retention through device power loss is also allowed, no additional SMBus packet overhead is incurred after address assignment. (i.e. subsequent accesses to assigned slave addresses have the same overhead as accesses to fixed address devices), and any SMBus master can enumerate the bus. The superlink device 360 will support ARP. The SMBus has a plurality of registers that can be accessed through specified addresses.

Figure 9:
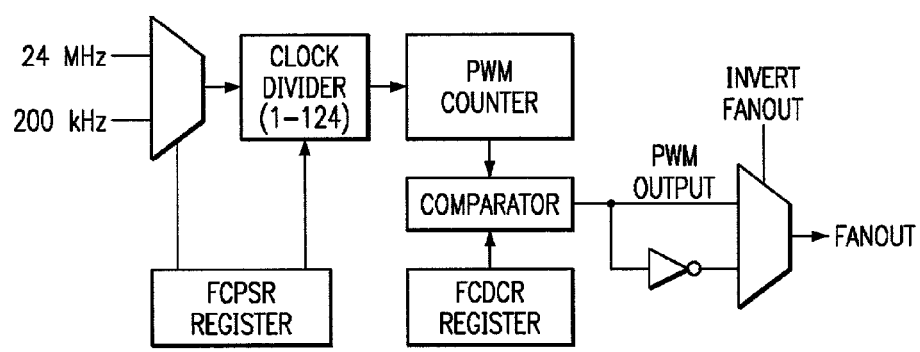
FIG. 9 illustrates a block diagram of a preferred embodiment of a Pulse Width Modulation (PWM) Generator (FANOUT) in accordance with an embodiment of the present invention.

A preferred embodiment for the control and monitoring of the fan speed will next be described. FIG. 9 illustrates a block diagram of a preferred embodiment of a Pulse Width Modulation (PWM) Generator (FANOUT) in accordance with an embodiment of the present invention. The PWM generator preferably includes two Fans Speed Control and two Fans Speed Monitor units. The Fan Speed Control is a programmable PWM generator. The PWM generator output is used to control the fan's power voltage, which is correlated to the fan's speed. Converting a 0 to 100% duty cycle PWM signal to an analog voltage range is achieved by external circuitry. Some newer fans accept direct PWM input without any external circuitry.

The PWM Counter preferably comprises an 8-bit free-running counter that is cyclical. The FCDCR register contains the duty cycle so that when the counter exceeds the value the comparator will go low. The clock divider is controlled by the FCPSR register, supports a division factor of 1 to 124. The FCPSR register also controls the selection of the clock input.

Figure 10:
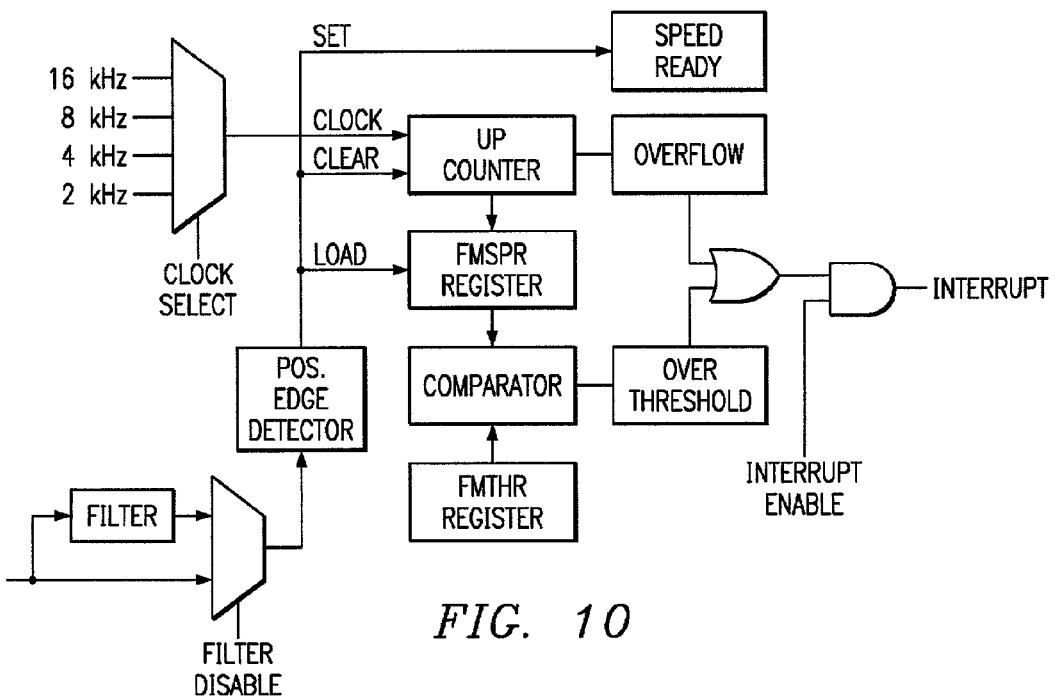
FIG. 10 shows a preferred embodiment of a block diagram of the fan speed monitor.

A preferred embodiment of a block diagram of the fan speed monitor is shown in FIG. 10. The Fan Speed Monitor determines the fan's speed by measuring the time between consecutive tachometer pulses, emitted by the fan once or twice per revolution. It may provide the system with a current speed-reading and/or alert the system, by interrupt, whenever the speeds drop below a programmable threshold. The Fan Speed Monitor indicates whether the speed is just below the threshold or inefficiently low to consider the fan stopped.

The up counter is an 8-bit counter that is clocked by the selected clock rate. Upon detection of the rising edge of FANIN, the FMSPR register captures the count. This is used to calculate the fan speed. If the count exceeds the threshold value (FMTHR) or the up counter reaches FF, then an interrupt is generated.

The input buffer of the FANIN signal is a hysteresis buffer (e.g., Schmitt trigger). This signal passes through a digital filter when the Filter Disable bit (bit 4 of the FMCSR register) is 0. The digital filter uses a 32 KHz clock to filter out any pulses shorter than 750 msec. This filter can be by-passed when setting bit 4 of the FMCSR register to 1.

The FANIN and FANOUT pins are multi-function pins that are shared with several GPIO pins. There are four sets of fan control and monitor configuration registers within the assigned LDN. Fan Control and Monitor 0 and 1 are assigned to the primary device. Fan Control and Monitor Register Set 2 and 3 defined to be in the secondary device and are preferably only accessible when a dock event has taken place. Any access to these registers when dock is not active will result in indeterminate data.

A preferred embodiment of the floppy disk controller (FDC) 378 will next be described. In general, preferably, the floppy disk controller 378 includes the following features: IBM System 3740 and 34 formats, ISO format, perpendicular recording format, data rates up to 2 Mbps, adapted to directly address 256 tracks; 255 step recalibrate command, programmable write pre-compensation, 16 byte FIFO, enhanced power-saving features, and integrated data separator, as examples.

A preferred embodiment of configuration registers for the FDC 378 are next described. Preferably, only one instance of the FDC 378 is allowed to be active at a time. When undocked, the FDC 378 in the primary device is active. When docked, the primary device FDC 378 becomes inactive and the secondary device FDC 378 becomes active. This must happen transparently to the operating system. The superlink device 360 upon detecting a docking event shall activate the FDC 378 in the secondary device and transfer the configuration register values from the primary to the secondary device. Accesses to or from the FDC 378 are directed to the FDC 378 in the secondary device until an undock event takes place.

When the FDC 378 in the secondary device is active, it is believed that the configuration registers in the primary FDC 378 core can be used to shadow the secondary configuration. In the event of an undock, the FDC configuration registers in the primary device are already configured, provided that synchronization between the two registers has been maintained.

When operating as the primary device and undocked, an FDC configuration register is used to control the configuration of the FDC 378. When a dock event takes place, the contents of this register are copied into the secondary device and control is transferred to the secondary device. Modifications to this register in the secondary device initiate a configuration update to the primary device. When an undock event takes place, control is transferred back to the primary device.

A drive ID register may be reset by hardware to 00h, for example. The drive ID register controls particular bits, e.g., bits 5 and 4, of the TDR register in an enhanced mode. When operating as the primary device and undocked, the drive ID register is used to control the configuration of the FDC. When a dock event takes place, the contents of the drive ID register are copied into the secondary device and control is transferred to the secondary device. Modifications to the drive ID register in the secondary device initiate a configuration update to the primary device. When an undock event takes place, control is transferred back to the primary device.

When operating as the primary device and undocked, the runtime registers in the primary device are used to control the configuration of the FDC. When a dock event takes place, the contents of these registers are copied into the secondary device and control is transferred to the secondary device. Modifications to this register in the secondary device initiate a configuration update to the primary device. When an undock event takes place, control is transferred back to the primary device. A plurality of other registers may be utilized, such as status, digital output, tape drive, data rate select, data FIFO, digital input, and configuration control registers, as examples.

A preferred embodiment of the General Purpose I/O ports (GPIO) will next be described. The GPIO functional block preferably includes 32 pins, arranged in four 8-bit ports. All pins in Port 0 through 3 are I/O and have full event detection capability, enabling them to trigger the assertion of /SMI and PME signals. The SMI can be configured to route to the serial IRQ. GPIO ports are preferably powered by $V_{SB}$ so it can be configured to support wake-up events. These pins can be used to perform various tasks while $V_{SB}$ is present and $V_{DD}$ is not.

When used in a docked environment, superlink 360 provides for total of 64 GPIO pins, arranged in 8 8-bit ports. Some ports are not accessible unless docked. Several of the GPIO port pins are multifunction pins and can be configured to support specific use functions. Among the functions are Fan Control and Monitor functions and Watchdog timer user defined inputs.

FIG. 11 illustrates a block diagram of a preferred embodiment of the GPIO basic functionality. The functionality of the GPIO port is divided into basic functionality that includes the manipulation and reading of the GPIO pins, and enhanced functionality that includes event detection and system notification. The basic functionality of the GPIO pin is based on four configuration bits and a bit slice of runtime registers GPDO and GPDI. The value that is written to the GPDO register is driven to the pin if the output is enabled. Reading from the GPDO register returns its contents regardless of the pin value or port configuration. The GPDI is a read-only register, reading it returns the pin value regardless of what is driving it.

FIG. 12 shows a block diagram of a preferred embodiment for event detection by the GPIO ports 362. The GPIO ports 362 support system notification based on event detection. The functionality is based on six configuration bits and a bit slice of status and enable runtime registers located in the ACPI runtime register space. Two trigger types of event detection are preferably supported: edge and level. The port can be configured to support either positive or negative edges. The input signal can be optionally debounced for about 15 ms before entering the detector.

System notification on GPIO triggered events is by means of assertion of one or more of the following output pins: Interrupt request (Serial IRQ), System Management Interrupt (SMI#), and Power-up Request (PME#), as examples.

The input signal can be debounced for about 15 msec before entering the detector. The signal state is transferred to the detector preferably only after a debouncing period during which the signal has no transitions, to endure the signal is stable. The debouncer adds 15 msec of delay to both assertion and de-assertion of the event pending indicator.

The superlink device 360 is capable of locking the attributes of each GPIO pin function. The following attributes can be locked: Output Enable, Output Type, Static Pull-up, and Driven Data, as examples. GPIO pins are locked per pin by setting the LOCK bit in the appropriate GPIO Pin Configuration Register. When the LOCK bit is set, the configuration of the associated GPIO pin can preferably only be released by a hardware reset.

A plurality of configuration and runtime registers are preferably utilized for the GPIO ports 362.

A preferred embodiment for the parallel port 370 will next be described. The parallel port 370 preferably supports all IEEE 1284 standard communication modes: Compatibility (known also as Standard or SPP), Bi-directional (known also as PS/2), FIFO, EPP (known as Mode 4) and ECP (with an optional Extended ECP mode), as examples. Regarding configuration registers, preferably only one instance of the Parallel port is allowed to be active at a time. When undocked, the Parallel port in the primary device is active. When docked, the primary device becomes inactive and the secondary device becomes active. This must happen transparently to the operating system. The superlink device 360 upon detecting a docking event shall activate the Parallel port in the secondary device and transfer the configuration and runtime registers values from the primary to the secondary device. Accesses to or from the Parallel Port are directed to the Parallel Port in the secondary device until an undock event takes place.

When the Parallel port in the secondary device is active, the configuration registers in the primary core can be used to shadow the secondary configuration registers. In the event of an undock, the Parallel port configuration registers in the primary device are already configured, provided that synchronization between the two registers has been maintained.

The following sequence is preferably used to program the parallel port configuration registers: first, enter Configuration Mode. Note that it is preferable that interrupts be disabled for the duration of the two writes. Next, registers are configured, these registers being accessed by first writing the number of the desired register to port CSR, then writing or reading the selected register through a configuration register data port. Finally, the configuration mode is exited.

Several parallel port Configuration Registers CSR may be utilized, including run time, ECP address FIFO, EPP DATA PORTs, Standard Parallel Port Data FIFO (SDFIFO), and extended control register (ECR), and other configuration registers.

A preferred embodiment for the serial port 368 will next be described. The Serial port provides UART functionality. The generic SP1 supports serial data communication with a remote peripheral device or modem using a wired interface. The serial port preferably includes the following features:

Fully Programmable Serial Interface Characteristics; 5-, 6-, 7-, or 8-Bit Characters; Even-, Odd-, or No-Parity Bit Generation and Detection; 1-, 1½-, or 2-Stop Bit Generation; Baud Generation (DC to 562 Kbit/s); 16-byte storage space for both the transmitter and receiver FIFOs; Programmable Baud Rate Generator Allows Division of Any Input Reference Clock by 1 to (2^16−1) and Generates an Internal 16×Clock; Standard Asynchronous Communication Bits (Start, Stop, and Parity) Added to or Deleted From the Serial Data Stream; False Start Bit Detection; Line Break Generation and Detection; Internal Diagnostic Capabilities; Loopback Controls for Communications Link Fault Isolation; Break, Parity, Overrun, Framing Error Simulation; Fully Implementation of Modem Control Functions (CTS, RTS, DSR, DTR, RI, and DCD).

While the clock source for the baud rate generator is not critical, it is preferable to select a rate or two to support and select a clock frequency based upon the baud rate targeted. A plurality of configuration and runtime registers, as well as other registers such as receiver buffer, transmitter holding, interrupt enable, interrupt identification, FIFO control, line control, modem control, line status, modem status, and scratch registers, as examples, are preferably utilized for the serial port 368.

The ACE contains a programmable baud generator that takes a clock input and divides it by a divisor in the range between 1 and ($2^{16}$ −1). The output frequency of the baud generator is 16× the baud rate. The formula for the divisor is:

divisor#=XIN frequency input÷(desired baud rate×16)  Equation 1:

Two 8-bit registers, called divisor latches, store the divisor in a 16-bit binary format. These divisor latches must be loaded during initialization of the serial port in order to ensure desired operation of the baud generator. When either of the divisor latches is loaded, a 16-bit baud counter is also loaded to prevent long counts on initial load.

A preferred embodiment for the watchdog timer 364 will next be described. The watchdog timer is adapted to prompt the system via SMI or an interrupt when no system activity is detected on a predefined selection of system events for a predefined period of time between 1 and 255 minutes. The timer monitors four maskable system events, the serial port and up to three user-defined input pins.

The watchdog timer 364 comprises an 8-bit counter, three registers and some logic. The counter is preferably a countdown counter that is loaded from the WDTO register. When the counter reaches 0, it stops counting and sets a bit such as the /WDO status bit. If a trigger event occurs before the counter reaches 0 then the counter is reloaded and restarts counting.

A plurality of registers such as configuration, timeout, and watchdog mask registers, as examples, are preferably utilized for the watchdog timer 364.

FIG. 13 illustrates a block diagram of a preferred embodiment for the high speed serial interface 388 of FIG. 6. The serial interface block preferably comprises an 8B/10B encoder/decoder and the high speed serial interface. The high speed serial interface preferably comprises two signal pairs operating at a standard line speed, e.g., 1.25 Gbps, 1.6 Gbps, or 2.5 Gbps, as examples. The signal pairs preferably operate in dual simplex fashion. The data is encoded using the 8B/10B encoding that is common to Gigabit Ethernet transmission.

The high speed data output driver preferably comprises a current-mode logic (CML) differential pair with on-chip termination resistors. The transmitter has a 50 Ω on-chip pull-up resistor at the CML output. The high speed data receiver has a 50 Ω on-chip termination resistor at the CML input. The on-chip resistors terminate to the VDDT1 supply, which must be connected to the 1.8V analog supply.

The transmitter portion registers incoming 8-bit wide data on the rising edge of TX_CLK. The data is then 8B/10B encoded, serialized and transmitted sequentially over the differential High Speed I/O channel. The clock multiplier, multiplies the reference clock (REFCLK) by a factor of 20 times, providing a signal which is fed to the parallel-to-serial shift register. Data is transmitted LSB (D0) first. The transmitter also inserts commas at the beginning of the transmission for byte synchronization.

The receiver portion accepts 8B/10B encoded differential serial data. The interpolator and clock recovery circuit will lock to the data stream and extract the bit rate clock. This recovered clock is used to retime the input data stream. The serial data is then aligned to 10-bit word boundaries, 8B/10B decoded and output on a 8 bit wide parallel bus synchronized to the extracted receive clock.

The data transmission latency is defined as the delay from the initial 8-bit word load to the serial transmission of bit 0. The transmit latency is preferably specified to be 10 bit times. Note that this latency preferably only applies to the portion of the circuitry starting from the 8B/10B encoder to the transmission of bit 0 on the serial interface. Additional latencies exist within the system which include packetization, FIFO depth and arbitration times. This will have some variance to it, which makes determining an exact latency difficult.

The serial-to-parallel data latency is the time from when the first bit arrives at the receiver until it is output in the aligned parallel word.

A reference clock (REFCLK) is an external input clock that synchronizes the transmitter interface. The reference clock is then multiplied in frequency 20×to produce the internal serialization clock. The internal serialization clock is frequency locked to the reference clock and used to clock out the serial transmit data.

The serial interface is optimized for operation at a serial data rate of 1.25 Gbit/s. The REFCLK input must be 62.5 MHz. REFCLK must be within ±100 PPM of the desired parallel data rate clock. The duty cycle should be not greater than 40/60 and jitter should be less than 40 ps at frequencies above 500 kHz.

A preferred embodiment for the serdes 364 will next be described. The parallel-to-serial shift register takes in 10 bit wide data multiplexed from the 8B/10B encoder and converts it to a serial stream. The shift register is clocked by the internally generated bit clock, which is 20 times the TXBCLK input frequency. The LSB (D0) is transmitted first.

Serial data is received on the RXP, RXN pins. The interpolator and clock recovery circuit will lock to the data stream if the clock to be recovered is within ±200 PPM of the internally generated bit rate clock. The recovered clock is used to retime the input data stream. The serial data is then clocked into the serial-to-parallel shift registers. The 10 bit wide parallel data is then multiplexed and fed into the 8B/10B decoder where the data is then synchronized to the incoming data steam word boundary by detection of the K28.5 synchronization pattern.

A preferred embodiment for the 8B/10B encoder/decoder will next be described. True serial interfaces require a method of encoding to insure minimum transition density so that the receiving PLL has a minimal number of transitions in which to stay locked on. The encoding scheme maintains the signal DC balance by keeping the number of ones and zero's the same. This provides good transition density for clock recovery and improves error checking. The serial interface uses the 8B/10B encoding algorithm that is used by Fibre channel and Gigabit Ethernet.

The PCS layer maps the CMII signals into ten-bit code groups and vice versa, using an 8B/10B block coding scheme. The PCS uses the transmission code to improve the transmission characteristics of information to be transferred across the link. The encodings defined by the transmission code ensure that sufficient transitions are present in the PHY bit stream to make clock recovery possible in the receiver. Such encoding also greatly increases the likelihood of detecting any single or multiple bit errors that may occur during transmission and reception of information. The 8B/10B transmission code specified for use has a high transition density, is run length limited and is DC-balanced. The transition density of the 8B/10B symbols range from 3 to 8 transitions per symbol. The definition of the 8B/10B transmission code is specified in IEEE 802.3 z and ANSI X3.230-1994 (FC-PH), clause 11.

8B/10B transmission code uses letter notation describing the bits of an unencoded information octet. The bit notation of A,B,C,D,E,F,G,H for an unencoded information octet is used in the description of the 8B/10B transmission code-groups, where A is the LSB. Each valid code group has been given a name using the following convention: /Dx.y/ for the 256 valid data codegroups and /Kx.y/ for the special control code-groups, where y is the decimal value of bits EDCBA and x is the decimal value of bits HGF (notated as K<HGF.EDCBA>). Thus, an octet value of FE representing a code-group value of K30.7 would be represented in bit notation as 111 11110.

The 8B/10B encoder converts 8 bit wide data to a 10 bit wide encoded data character to improve its transmission characteristics. Each byte is fed into an encoder. The encoding is dependant upon two additional input signals, TX_EN and TX_ER. When TX_EN is asserted and TX_ERdeasserted then the data bit TXD[0 . . . 15] are encoded and transmitted normally. When TX_EN is deasserted and TX_ER is asserted, then the encoder will generate a carrier extend comprising two K23.7 (F7F7) codes. If TX_EN and TX_ER are both asserted then the encoder will generate a K30.7 (FEFE) code.

The encoder inserts the IDLE character set when no payload data is available to be sent. IDLE comprise a K28.5 (BC) code and either a D5.6 (C5) or D16.2 (50) character, for example. The K28.5 character is defined by IEEE802.3z as a pattern comprising 0011111010 (a negative number beginning disparity) with the 7 MSB's (0011111) referred to as the comma character.

The 8B/10B decoder converts 10 bit encoded data back into 8 bits. A comma detect circuit is included that is designed to provide for byte synchronization to an 8B/10B transmission code. When parallel data is clocked into a parallel to serial converter, the byte boundary that was associated with the parallel data is now lost in the serialization of the data. When the serial data is received and converted to parallel format again a way is needed to be able to recognize the byte boundary again. Generally, this is accomplished using a synchronization pattern. This is generally unique a pattern of 1's and 0's that either cannot occur as part of valid data or is a pattern that repeats at defined intervals. 8B/10B encoding contains a character called the comma (b'0011111' or b'1100000') which is used by the comma detect circuit to align the received serial data back to its original byte boundary. The decoder detects the K28.5 comma, generating a synchronization signal aligning the data to their 10 bit boundaries for decoding. It then converts the data back into 8 bit data, removing the control words.

Two additional signals, RX_DV and RX_ER define decoding status. When RX_DV is asserted and RX_ER deasserted then the data bits RXD[0 . . . 15] are received normally and decoded. When RX_DV is deasserted and RX_ER asserted, then the decoder generates a K23.7 code (F7F7) on the RXD bits indicating carrier extend. If RX_DV and RX_ER are both asserted then an error has been decoded. If the error was due to error propagation code, then the RXD bits will output hex FEFE. If the error was due to an invalid pattern then the data output on RXD will be undefined. When RX_DV and RX_ER are both deasserted then an IDLE is indicated by the RXD bits outputting a K28.5 code followed by either a D5.6 or D16.2 code.

A preferred embodiment of a start-up procedure will next be described. Before node transfers begin, the devices on both ends of the wire must be in a valid state and ready to transmit and receive the packets. The start-up procedure fixes some elements to provide upward and backward compatibility. A start-up handshaking mechanism comprises both primary and secondary nodes sending the config_reg update packets. Each node upon receipt of these packets will confirm by returning the updated register values to the source node.

Figure 14:
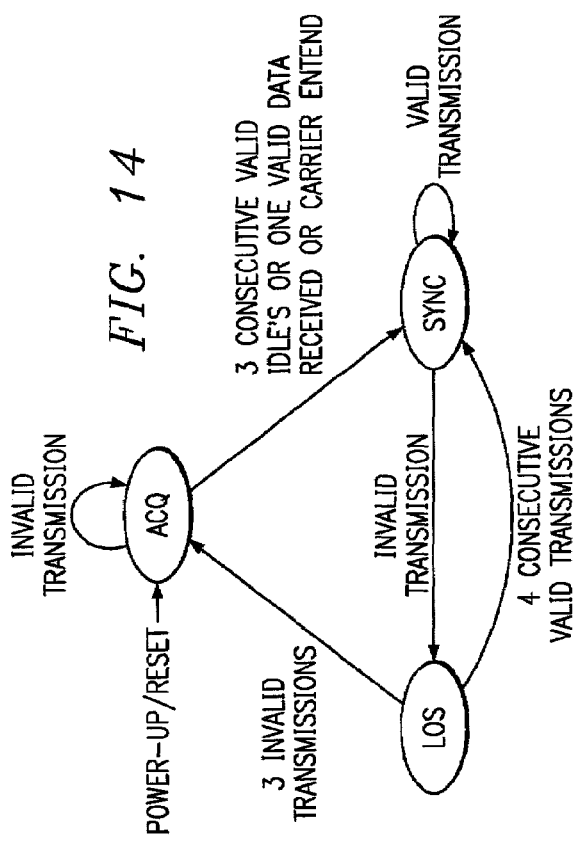
FIG. 14 illustrates a preferred embodiment of a synchronization state diagram for the high speed serial interface synchronization.

FIG. 14 illustrates a preferred embodiment of a synchronization state diagram for the high speed serial interface synchronization. The serial interface includes a synchronization state machine which is responsible for handling link initialization and synchronization. Upon power up or reset, the state machine enters the acquisition (ACQ) state and searches for IDLE. Upon receiving 3 consecutive IDLE's or a carrier extend, the state machine will enter the synchronization (SYNC) state. If the state machine receives valid data or an error propagation during the acquisition process, it will immediately transition to the SYNC state. Loss of synchronization occurs whenever four consecutive invalid transmissions have been detected or when 4 invalid transmissions occur prior to receiving 4 consecutive valid data groups or IDLE's. A single invalid transmission received while in the SYNC state will cause the state machine to transition to the loss of synchronization (LOS) state. Receiving three additional invalid transmissions before 4 consecutive valid transmissions occur while in LOS will force the state machine back to the acquisition state. If four consecutive valid transmissions occur then the state machine will transition to the SYNC state. Embodiments of the invention include high speed serial inteface configuration registers, high speed serial configuration registers, high speed serial TXMODE Configuration Register, and high speed serial status registers, as examples of registers utilized.

A preferred embodiment of the packet engine shown in FIG. 13 will next be described. The packet engine is responsible for the generation and interpretation of the packets used to transfer data between the two superlink 360/362 (of FIG. 4) devices. The basic anatomy of a packet preferably includes a header, data and parity. The packet engine generates the appropriate cycle type header for the data to be transferred and generates the CRC for insertion in the end. The packet type header indicates the size and type of packet being transmitted. On the receiving end the data is extracted from the packet, checked for CRC and sent to the appropriate interface.

A preferred high-speed serial wire protocol addresses a full duplex communication path with a continuous signaling rate for a point-to-point connection between two nodes. The protocol itself is not limited to any specific signaling rate, but the rate shall be constant±transceiver tolerances and no speed scaling is built into the protocol. In the point-to-point connection, both nodes must implement the identical signaling rate within the transceiver tolerance. For the superlink device 360, the preferred signaling rate is around 1.25 Gb/s, for example.

Regarding the packet format, the serial protocol preferably utilizes 8-bit wide variable length packets transmitted MSB first. The last byte of the packet contains the parity calculation. The remaining bits contain packet specific data that are in command specific endian ordering.

A variety of various packets are used for the serial protocol. Packet fields that are reserved shall be transmitted as zeroes and the receivers shall not use the information contained in the reserved fields for anything other than computing parity. Packet definitions preferably include, as examples: Configuration Register Read Configuration Register Write; Configuration Register Read Response; Configuration Register Write Response; LPC I/O Read; LPC I/O Write; LPC Memory Read; LPC Memory Write; LPC DMA Read; LPC DMA Write; LPC I/O Read Response; LPC I/O Write Response; LPC Memory Read Response; LPC Memory Write Response; LPC DMA Read Response; LPC DMA Write Response; SCP Assert SCP Dis-assert; SCP Assertion; SCP Dis-assertion; and AC97 Link Packet.

A packet type field indicates the type of packet that is transmitted over the serial interface. This field is preferably comprised of two sub-fields: a 3 bit packet class sub-field and a 5 bit cycle type sub-field.

Preferred embodiments of the various packets used in communication between the two superlink nodes will be described next. The Configuration Register Read is a 5-byte packet comprising Packet Type, Address16 and CRC16. The Configuration Register Write is a 6-byte packet comprising Packet Type, Address16, Data and CRC16. The Configuration Read Response is a 4-byte packet comprising Packet Type, Data and CRC16. The Configuration Write Response is a 3-byte packet comprising Packet Type and CRC16.

The LPC I/O Read is a 5-byte packet comprising Packet Type, Address16 and CRC16. The LPC Write is a 6-byte packet comprising Packet Type, Address16, Data and CRC16. The LPC Memory Read is a 7-byte packet comprising Packet Type, Address32 and CRC16. The LPC Memory Write is an 8-byte packet comprising Packet Type, Address32, Data and CRC16. The LPC DMA Read is a 4-byte packet comprising Packet Type, Channel/Size, Data and CRC16. The LPC DMA Write is a 5-byte packet comprising Packet Type, Channel/Size and CRC16. The LPC Read Response is a 4-byte packet comprising Packet Type, Data and CRC16. The LPC Write Response is a 3-byte packet comprising Packet Type and CRC16. The LPC Memory Read Response is a 4-byte packet comprising Packet Type, Data and CRC16. The LPC Memory Write Response is a 3-byte packet comprising Packet Type and CRC16. The LPC DMA Read Response is a 4-byte packet comprising Packet Type, Data and CRC16. The LPC DMA Write Response is a 3-byte packet comprising Packet Type and CRC16.

The SCP Assert Request is a 5-byte packet comprising Packet Type, Address16 and CRC16. The SCP Dis-Assert Request is a 5-byte packet comprising Packet Type, Address16 and CRC16. The SCP Assert Response is a 3-byte packet comprising Packet Type and CRC16. The SCP Dis-Assert Response is a 3-byte packet comprising Packet Type and CRC16.

The AC97 Link packet is a 37-byte packet comprising Packet Type, Data(33-0) and CRC16. In order to preserve the synchronization the start of the audio frame is the start of the data packet. The frame order received is the same order in the packet.

Preferred embodiments of the packet fields will next be described. The PACKET TYPE field indicates the type of packet that is transmitted over the serial interface. This field comprises two sub-fields: a 3 bit packet class sub-field and a 5 bit cycle type sub-field. The ADDRESS16 field is a 16-bit address field used in certain command packets. It is transmitted most significant bit first. The ADDRESS32 field is a full 32-bit address field used in LPC memory read/write command packets. It is transmitted most significant bit first. The DATA field is an 8-bit field that contains the data to be transmitted over the serial interface.

The CRC16 field is a 16-bit field that contains a CRC16 calculation of the entire packet. Channel is preferably used only for DMA cycles to indicate the channel number that is being serviced. The SIZE field is preferably used only for DMA cycles indicating the size of the DMA transfer.

A preferred embodiment for the LPC controller 340 (of FIG. 6) will next be described. The low pin count bus interface 354 LPC is utilized in many chipsets, e.g. Intel core chipsets. One of its purposes was to enable a system without an ISA or X-bus. The most common implementation used currently is the attachment of a Super I/O device. Superlink 360 is adapted to replaces the Super I/O chip on the portable computer motherboard, providing the same functionality as before, while extending the Super I/O functionality to an attached dock.

The LPC interface 354 preferably comprises 7 required and 6 optional signals, all supported by the superlink device 360. When superlink 360 resides on the motherboard, the LPC interface 354 is activated and operates as described in the Low Pin Count Interface Specification 1.0. When superlink 360 resides on the dock, the LPC interface 354 is disabled.

Table 5 below shows which LPC cycle types preferably supported by the superlink LPC interface. Bus Master cycles are not supported.

TABLE 5

| Cycle Type | Size Supported |
| --- | --- |
| Memory Read | 1 Byte |
| Memory Write | 1 Byte |
| I/O Read | 1 Byte |
| I/O Write | 1 Byte |
| DMA Read | 1, 2, 4 Bytes |
| DMA Write | 1, 2, 4 Bytes |

Preferred embodiments of cycles of the LPC interface will next be described. Data transfers on the LPC bus are preferably serialized over a 4-bit bus. The general characteristics of this bus include one control line, called LFRAME#, for example, which is used by the host to start or stop transfers. No peripherals drive this signal. Another bus characteristic includes a LAD[3:0] bus, which communicates information serially. The information conveyed is cycle type, cycle direction, chip selection, address, data, and wait states. Another characteristic includes side-band signals, optionally implemented, which convey interrupts and power management features. These signals are the same as many signals found on current motherboard implementations.

A preferred general flow of cycles is as follows. First, a cycle is started by the host when it drives LFRAME# active and puts appropriate information on the LAD[3:0] signal lines. The host drives information relative to the cycle, such as address, or DMA channel number, or bus master grant. For DMA and target cycles, the host also drives cycle type (memory or I/O), read/write direction, and size of the transfer. The host optionally drives data, and turns the bus around to monitor the peripheral for completion of the cycle. The peripheral indicates completion of the cycle by driving appropriate values on the LAD[3:0] signal lines, and potentially drives data. Finally, the peripheral turns the bus around to the host, ending the cycle.

The LPC bus preferably does not support split or delayed transactions or retries. A cycle is expected to complete before the next bus cycle can be initiated. If a peripheral cannot immediately respond with the requested information, it adds wait states. This is accomplished by asserting SYNC transactions.

Preferred embodiments of possible SYNC transactions will next be described. If LPC controller 340 needs to assert wait states, it does so by driving '0101b' (short SYNC) or '0110b' (long SYNC) on LAD[3:0] until it is ready. When ready, LPC controller 340 may choose to drive '0000b' (ready with no error), '1010b' (ready with error), or, in the case of DMA transfers, '1001b' (ready with more requested).

On any particular cycle, if the host or peripheral chooses to insert wait states, LPC controller 340 must choose one type of SYNC wait value ('0101b' or '0110b'), and must not change it until it asserts one of the ready SYNC values.

The short SYNC is used for normal wait-states. This is where the cycle will complete within a few clocks. It is normally assumed that the maximum number of SYNC clock is less than 8.

The long SYNC is used where the number of wait-states is large. This would typically be used for EPP cycles, where the number of wait-states could be quite large (>1 microsecond). By distinguishing this from short SYNC, the host may issue separate time-out values to abort the cycle. There is no maximum number of wait states assumed for a long SYNC so care should be taken to avoid a deadlock situation.

The LPC controller 340 is responsible for generating the appropriate SYNC indication. This usually means that long SYNC will be generated when a dock is attached and the transaction is targeted for a device in the dock.

A preferred embodiment of the LPC interface 354 will next be described. Three types of transactions that can the LPC interface 354 can respond to include I/O transactions targeting the configuration registers, I/O transactions targeting run time registers and DMA transactions. The transaction within the superlink 360 domain is split into a request and an acknowledge transaction. The transaction on the LPC bus is received by the LPC controller and packetized with the appropriate header. The acknowledge is the response from the device in the dock containing an acknowledge and if appropriate, data. A Memory Read, for example, would generate a Memory Read Packet and a Read Response packet containing the requested data byte. Once the response packet is received, the LPC controller 340 ends the wait state and generate the appropriate command to complete the transaction.

The largest packet transmitted is 56 bits corresponding to 56 nanoseconds of transmission time, for example. The largest response packet is 32 bit requiring 32 nanoseconds of transmission time. One LPC clock period is 30 nanoseconds. Round trip transmission would take a minimum of 3 LPC clocks through the serial interface. This would be in addition to the time required to packetize the commands.

Figure 15:
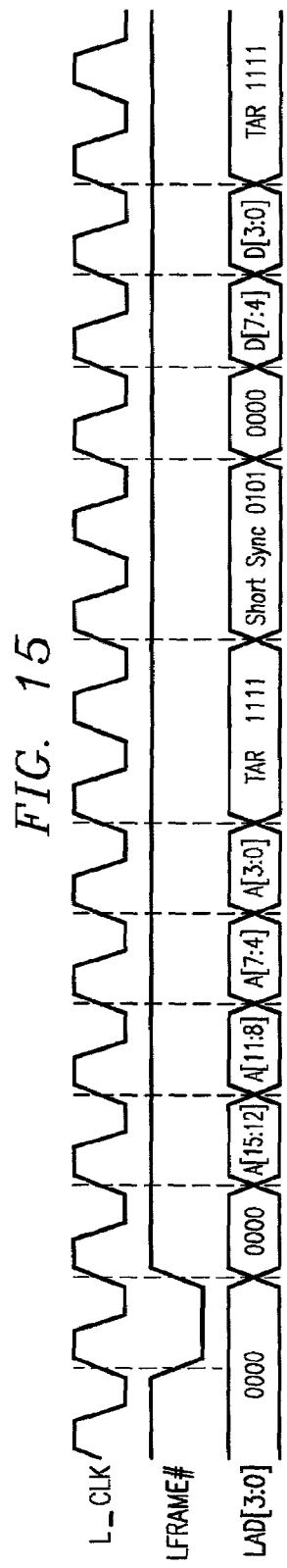
FIG. 15 illustrates a preferred embodiment of a timing diagram of a sample LPC read from a configuration register.
Figure 16:
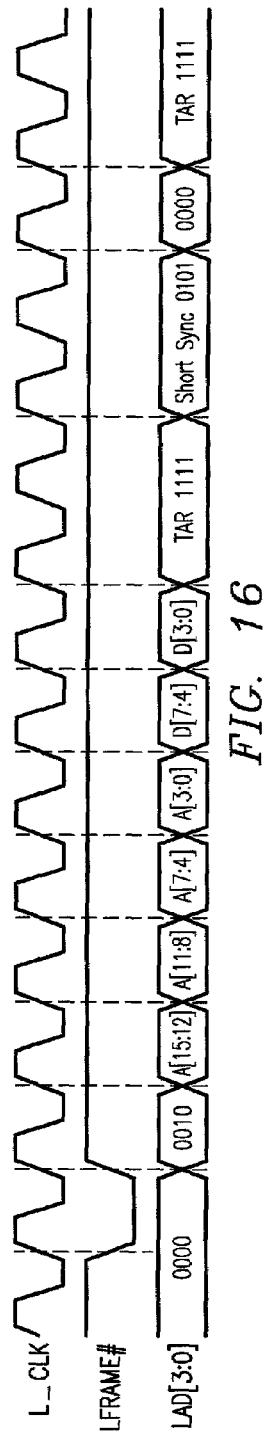
FIG. 16 shows a preferred embodiment of a timing diagram of a sample LPC write to a configuration register.

Preferred embodiments of transactions to configuration registers will be described next. FIG. 15 illustrates a preferred embodiment of a timing diagram of a sample LPC read from a configuration register. FIG. 16 shows a preferred embodiment of a timing diagram of a SAMPLE LPC Write to A CONFIGURATION REGISTER. Reads and writes to configuration registers preferably always target the primary superlink device. Read transactions will be read directly from the configuration registers. Write transaction will be written to the primary superlink configuration registers. If a write occurs that targets a configuration register on the secondary superlink, the configuration register block will generate a configuration transaction over the serial interface to update the secondary superlink's configuration register. Transactions targeting the configuration register should preferably always respond with the short sync pattern.

Figure 17:
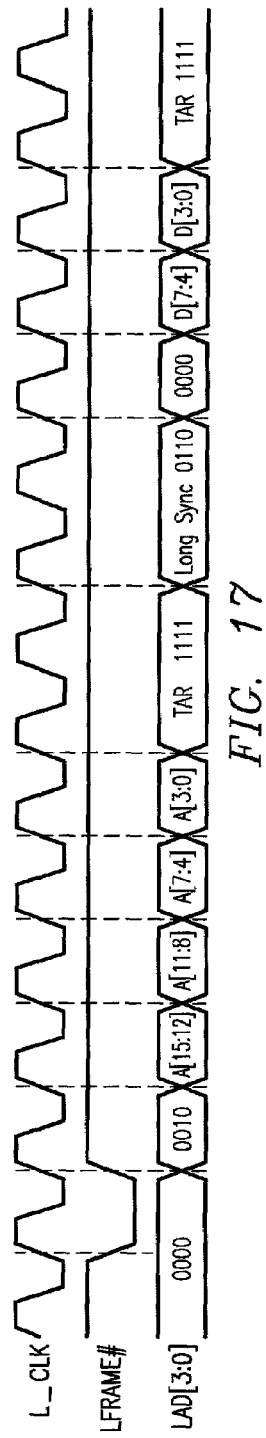
FIG. 17 shows a preferred embodiment of a sample LPC read from a run time register

A preferred embodiment of a sample LPC read from a run time register is shown in FIG. 17. Read transactions accessing run time registers should be forwarded either to the core in the primary superlink 360 or to the serial interface for transmission to the secondary superlink depending upon the location of the device targeted. A read transaction can return data as soon as either a primary superlink core returns data or a read response packet is received from the secondary superlink. If no response is received to a read request within X LPC clocks (X should be determined by the maximum time it will take a core to return data plus the time it takes to send both the read packet and the read response packet), the LPC interface should assume an error has occurred and return the appropriate sync pattern. Read transactions to run time registers on the secondary device should use the long sync pattern to ensure that there is enough time to complete the transaction on the secondary superlink.

Figure 18:
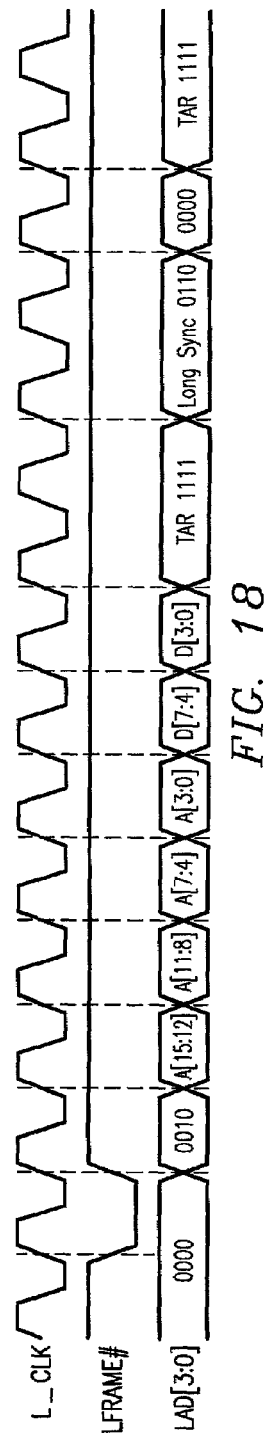
FIG. 18 shows a preferred embodiment of a sample LPC write to a run time register.

A preferred embodiment of a sample LPC write to a run time register is shown in FIG. 18. Write transactions accessing run time registers should be forwarded either to the core in the primary superlink or to the serial interface for transmission to the secondary superlink. A write transaction can return write complete as soon as either a primary superlink core returns write complete or a write response packet is received from the secondary superlink. If no response is received to a write request within X LPC clocks (X should be determined by the maximum time it will take a core to return data plus the time it takes to send both the write packet and the write response packet), the LPC interface should assume an error has occurs and return the appropriate sync pattern. Write transactions to run time registers should use the long sync pattern to ensure that there is enough time to complete the transaction on the secondary superlink.

Figure 19:
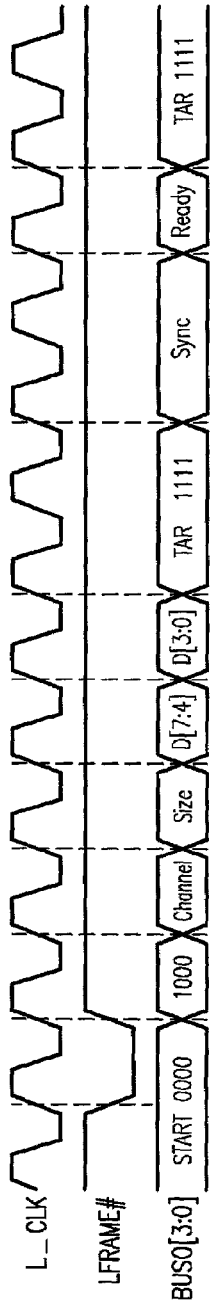
FIG. 19 shows a preferred embodiment for a sample LPC DMA write is shown.
Figure 20:
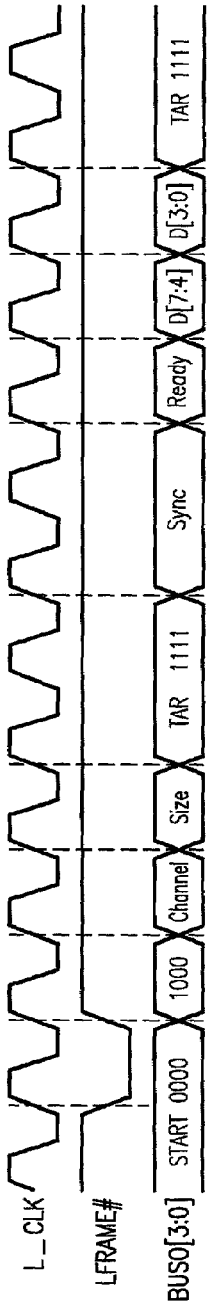
FIG. 20 shows a preferred embodiment for a sample LPC DMA read is shown.

Preferred embodiments for DMA transactions will next be described. A preferred embodiment for a sample LPC DMA write is shown in FIG. 19, and a preferred embodiment for a sample LPC DMA read is shown in FIG. 20. DMA transactions are initiated by the superlink when either a DMA packet is received from the secondary superlink or a DMA request is received from one of the cores in the primary superlink. A DMA transaction is initiated by submitting a DMA request on the LDRQ# line. The superlink part will respond to a DMA transaction with the short sync pattern if the DMA request came from the primary superlink device and the long sync pattern if the DMA request came from the secondary superlink device. The LPC interface will not complete a DMA transaction until the DMA transaction has been received by the core that initiated the DMA request. This is accomplished by either by receiving an acknowledge from a primary superlink core or by sending a DMA response packet to the secondary superlink and receiving a DMA acknowledge packet. If no acknowledge is received within X LPC clocks (X should be determined by the maximum time it will take a core to return data plus the time it takes to send both the DMA response packet and the DMA acknowledge packet), the LPC interface should assume an error has occurs and return the appropriate sync pattern. The superlink DMA engine will need to support all DMA sizes supported by the internal cores.

Clock Run is a signal which is used by devices to request starting (or speeding up) the clock, CLK. CLKRUN# also indicates the clock status. For devices, CLKRUN# is an open drain output and also an input. A device requests the central resource to start, speed up or maintain the interface clock by the assertion of CLKRUN#. The central resource is responsible for maintaining CLKRUN# asserted, and for driving it high to the deasserted state. CLKRUN# is low upon deassertion of reset (since CLK is running upon deassertion of reset).

Superlink will use CLKRUN# to maintain the LPC clock if there is some internal process in progress which requires the LPC clock. Such processes include asserting a DMA request, asserting an interrupt over serial IRQ or other internal processes that use the LPC clock. Superlink should not have any internal processes that require the LPC clock to be on continuously. The superlink device should preferably only request the LPC clock to be restarted if there is a pending serial interrupt that needs to be signaled or a pending DMA request that needs to be signaled.

There are three main states in the clocking protocol: clock running in which the clock is running and the bus is operational; about to stop/slow down in which the central resource has indicated on the CLKRUN# line that the clock is about to stop/slow down; and clock stopped/slowed—the clock is stopped/slowed, with CLKRUN# being monitored for a restart.

Figure 21:
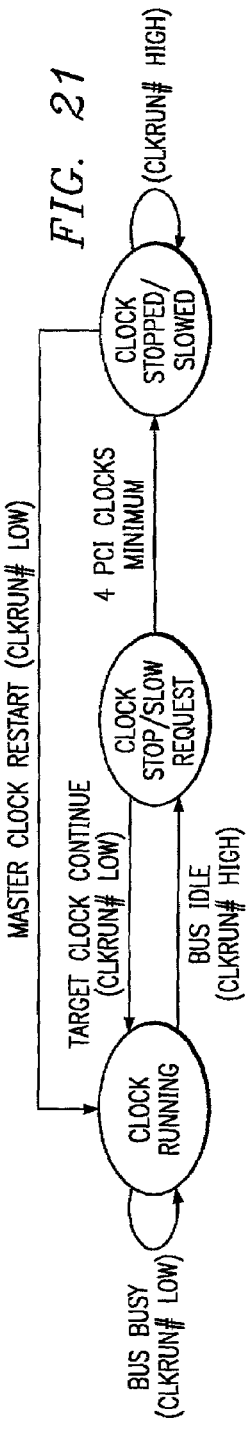
FIG. 21 shows a state diagram for preferred embodiment of the CLKRUN# and Bus States in operation.

A preferred embodiment of the CLKRUN# and Bus States in operation is shown in the state diagram of FIG. 21, which shows all of the LPC bus states and the level of the CLKRUN# signal for each of the corresponding Target/Master/Resource CLKRUN# driven state.

Figure 22:
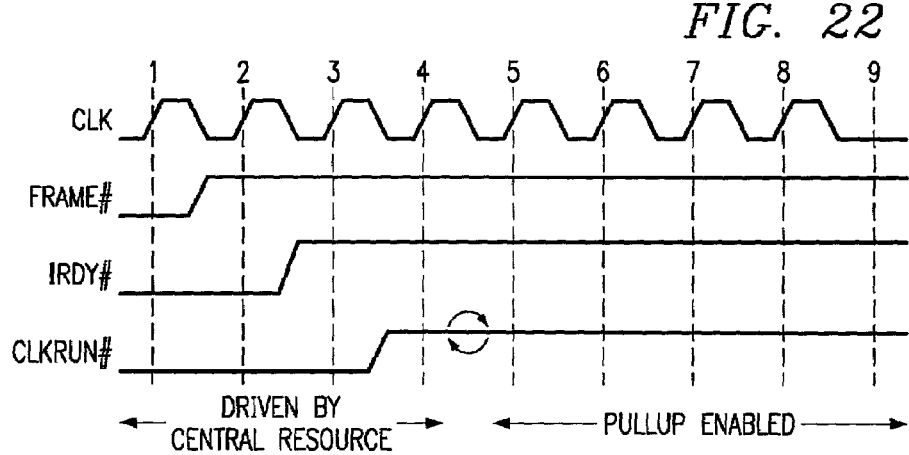
FIG. 22 shows a timing diagram of a preferred embodiment of clock stop or slow down.

A timing diagram of a preferred embodiment of clock stop or slow down is shown in FIG. 22. The central resource drives CLKRUN# low while CLK is running at a normal operating frequency. Before stopping the clock or slowing the clock down to a non-operational frequency, the central resource synchronously drives CLKRUN# high for one clock period, and then tri-states its driver. A low current pull-up (a keeper) must be provided by the central resource to prevent the line from floating. Implementations may disable the pull-up when the central resource samples CLKRUN# low.

CLK continues to run unchanged for a minimum of four clock periods after CLKRUN# is deasserted. In addition, CLK must not be stopped before the agent can request it to continue by asserting CLKRUN#. For example, after clock 8, the central resource may stop or slow down the clock if all of the conditions specified above are met.

Note that it is preferably that CLK is guaranteed to run unchanged for a minimum of four clock periods after CLKRUN# is deasserted. The central resource may keep CLK running unchanged for any number of clocks (greater than or equal to four).

LPC devices are required to maintain their states while the interface clock is stopped or the clock frequency is changed.

Figure 23:
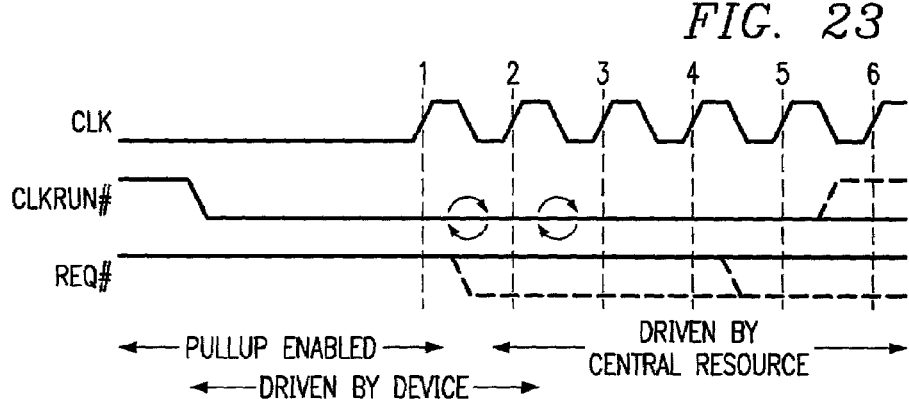
FIG. 23 shows a timing diagram of a preferred embodiment of clock start or speed up.

Clock start or speed up will next be described, with reference to the timing diagram of a preferred embodiment in FIG. 23. To request restoration of the clock, a device asserts the CLKRUN# signal asynchronously. The device holds CLKRUN# asserted until it detects two rising edges of CLK. After the second clock edge, the device must disable its open drain driver.

After detecting the assertion of CLKRUN#, the central resource starts the clock if the clock was stopped, or brings it to an operational frequency if the clock was slowed down.

The central resource drives CLKRUN# low at any time after it detects that the line is asserted by the device, but not later than on clock 3. The central resource may disable the pull-up on the CLKRUN# line at this time.

The central resource must not drive CLKRUN# high earlier than on clock 5. The device may not assert (start driving) CLKRUN# if it is already driven low by the central resource. The device must not assert CLKRUN# unless the line has been deasserted for two successive clocks, i.e., before the clock was stopped.

Figure 24:
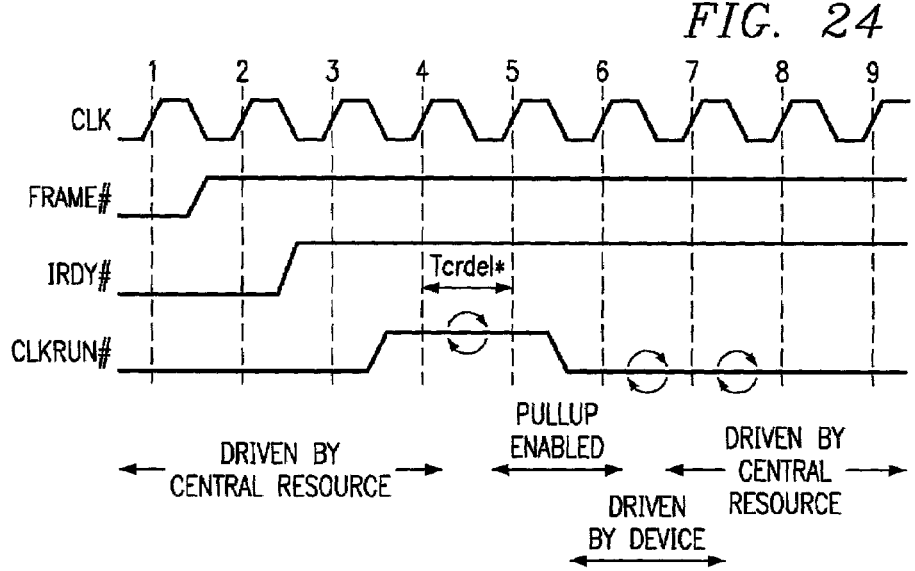
FIG. 24 shows a timing diagram of a preferred embodiment of maintaining clock.

A timing diagram of a preferred embodiment of maintaining clock is illustrated in FIG. 24. Certain devices may require the LPC clock to be active for completing some internal processes after a transaction is already completed. This is accomplished by the device asserting CLKRUN# after it has been deasserted for two successive clocks. The device must assert CLKRUN# within a certain time window (Tcrdel) to avoid interrupting the clock stream. Tcrdel minimum is 1* Tcyc (1 clock), and Tcrdel maximum is 2* Tcyc (2 clocks). The device samples CLKRUN# high on clock 4, and must drive CLKRUN# low no later than clock 6 but not earlier than after the turn around cycle which occurs after clock 4 to avoid interruption of CLK. The device keeps CLKRUN# asserted for two clocks (clocks 6 and 7 or clocks 7 and 8), and must disable its open drain driver after the second clock.

The central resource must not drive CLKRUN# high earlier than on the fourth clock edge after the CLKRUN# line was first sampled asserted.

The device may not drive CLKRUN# if it is already driven low by the central resource. The device must not assert CLKRUN# unless it has sampled the line high on a CLK rising edge, and must not drive CLKRUN# on the same clock edge on which the line is first sampled high.

Figure 25:
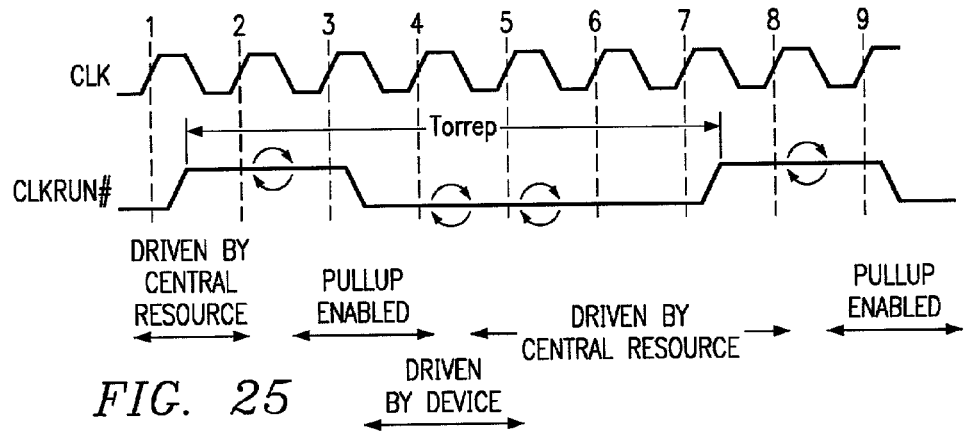
FIG. 25 shows a timing diagram of a preferred embodiment of multiple clock continues.

Clock continuation is preferably with minimum repetition, as shown in the timing diagram of FIG. 25 for a preferred embodiment of multiple clock continues. The minimum repetition rate for multiple clock continues Tcrrep is 6*Tcyc (6 clocks). The case occurs when a target does a clock continue, and the central resource immediately attempts to stop the clock again. This diagram, and the corresponding Tcrrep specify the minimum period of repetition by the central resource and target handshake.

Figure 26:
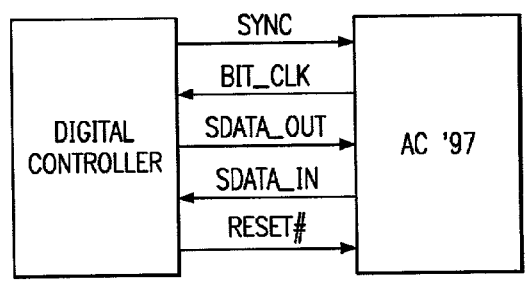
FIG. 26 illustrates a preferred embodiment of the AC '97 (AC Link) connection to digital controller.

A preferred embodiment of the AC '97 interface will next be described. The AC '97 codec communicates with its companion AC '97 Controller via a digital serial link, AC-link. All digital audio streams, optional modem line Codec streams, and command/status information are communicated over this point-to-point serial interconnect. A breakout of the signals connecting the two is shown in FIG. 26, a diagram of a preferred embodiment of the AC '97 (AC Link) connection to digital controller. For a detailed description of the AC-link, refer to the AC '97 Component specification, incorporated herein by reference.

The superlink device packetizes the AC-link frame for serialization on the one side and deserializes the packet for transmission on the other side. The superlink device does not perform any operation or interpretation of the AC-link data except to determine if the BIT_CLK needs to be shut off or to determine if a register reset has occurred. The default state for the AC-Link is disabled with all outputs tristated.

The AC-link can support multi-point connections between the digital controller and up to four codecs. Multiple Codec AC-link implementations must run off a common BIT_CLK. They can share SYNC, SDATA_OUT, and RESET# from the AC '97 Digital Controller. Each device requires its own SDATA_IN pin back to the controller. This prevents contention of multiple devices on one input. It also removes any unnecessary complexity from the Codecs. Superlink will support two SDATA_IN pins to the digital controller on the motherboard and two SDATA_IN (called PDATA_IN) pins to the codecs. This allows for two codecs to be connected to the secondary superlink device and for two codecs to be connected directly to the digital controller for a total of 4 codecs.

The superlink AC-Link interface can interface to either a primary codec, a secondary codec, or to a primary and secondary codec, as examples. When the AC-Link is operating as the primary codec the, the AC-Link will source the BIT_CLK, SDATA_IN0 will be defined as Codec ID 00, and SDATA_IN1 will be default as Codec ID 01. In primary codec mode the Codec ID of SDATA_IN0 is fixed as 00 but the Codec ID of SDATA_IN1 can be programmed to 01, 10 or 11. When the AC-Link is not operating as the primary interface, SDATA_IN0 will default to Codec ID 10 and SDATA_IN1 will default to Codec ID 11. In secondary codec mode the Codec ID's for SDATA_IN[0:1] can programmed to 01, 10 or 11 but can never be programmed to 00.

Figure 27:
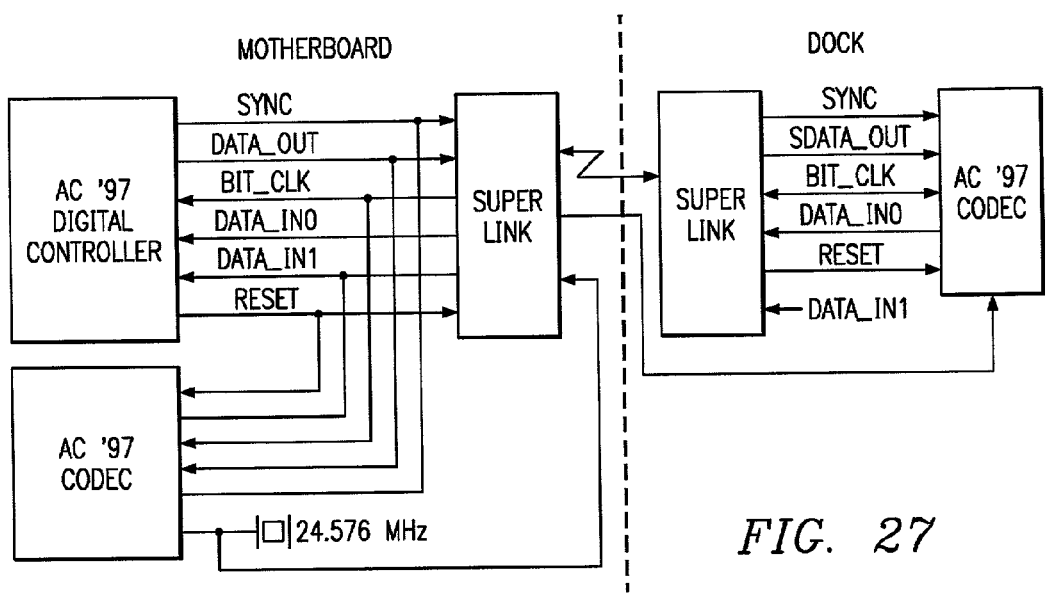
FIG. 27 shows a block diagram of a preferred embodiment of the superlink AC link interface.

A block diagram of a preferred embodiment of the superlink AC link interface is shown in FIG. 27. To keep the system synchronous, the primary and secondary Codecs must be supplied with the SAME 24.576 MHz clock, so they are operating on the same time base. Regardless of the high-speed clock source, basing all AC-link timing on the BIT_CLK provided by the Primary Codec (that on the Motherboard) is necessary to insure that everything on the AC-link will be synchronous.

AC '97 codec derives its clock internally from an externally attached 24.576 MHz crystal, and drives a buffered and divided down (½) clock (BIT_CLK) to its digital Controller over the AC-link. Clock jitter at the DACs and ADCs is a fundamental impediment to high quality output, and the internally generated clock will provide AC '97 codec with a clean clock that is independent of the physical proximity of AC '97's Digital Controller.

Figure 28:
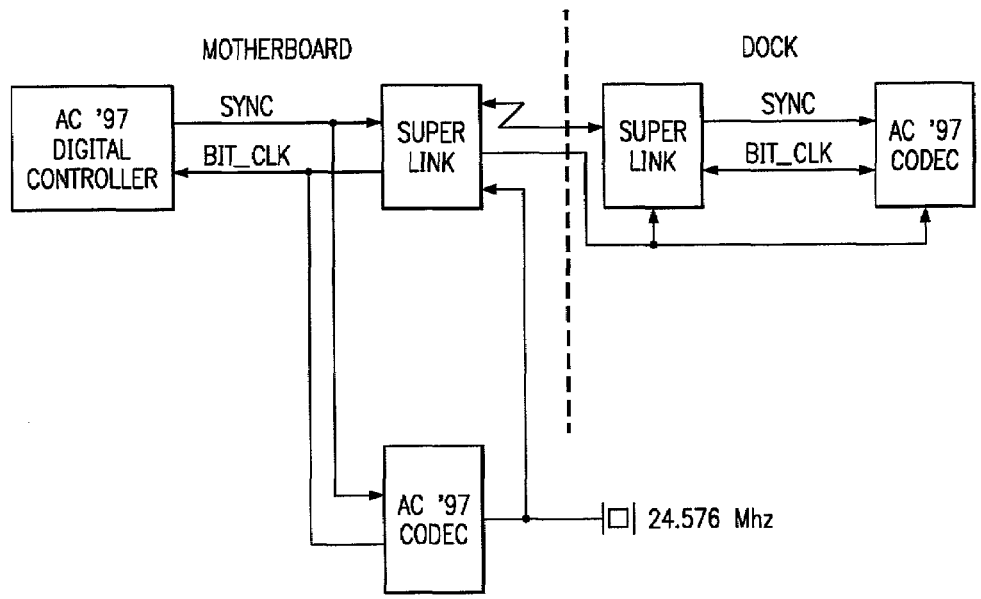
FIG. 28 shows a preferred embodiment of the AC '97 synchronization implementation.

A preferred embodiment of the AC '97 synchronization implementation is shown in FIG. 28.

A preferred embodiment of the AC link serial interface protocol will next be described. The AC link preferably incorporates a 5-pin digital serial interface that links it to the AC '97 Digital Controller. AC-link is a bi-directional, fixed rate, serial PCM digital stream. It handles multiple input, and output audio streams, as well as control register accesses employing a time division multiplexed (TDM) scheme. The AC-link architecture divides each audio frame into 12 outgoing and 12 incoming data streams, each with 20-bit sample resolution. The AC-link protocol provides for a special 16-bit time slot (Slot 0) wherein each bit conveys a valid tag for its corresponding time slot within the current audio frame.

Figure 29:
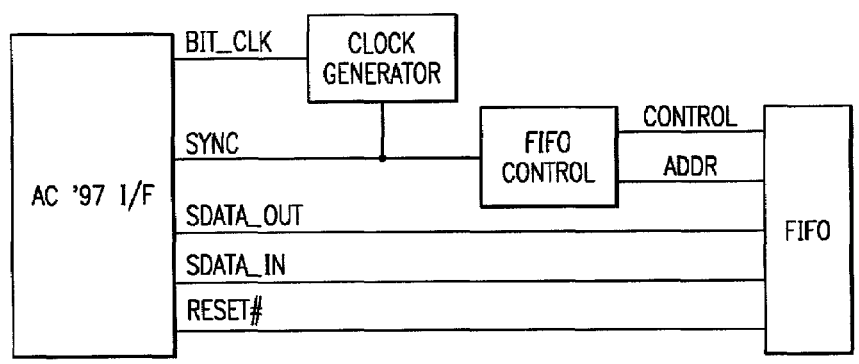
FIG. 29 illustrates a preferred embodiment of a superlink AC '97 controller block diagram.

The AC-link frame contains 256 bits at an interval of 20.8 microseconds. This is incorporated into a 32 byte packet for transmission on the serial link. Transmission time is 272 nanoseconds, for example. A preferred embodiment of a superlink AC '97 controller block diagram is shown in FIG. 29.

A preferred embodiment of the clock generator shown in FIG. 29 will next be described. When implemented in the dock, the clock generator divides BIT_CLK by 256 and with some wave shaping, outputs SYNC. When implemented in the motherboard, the clock generator receives a 24.576 MHz clock and divides it by 2 to generate BIT_CLK. When the superlink device is on the motherboard the device will take on the functions of the AC '97 primary codec, if the AC-Link is enabled and the LNKMD bit in the AC'97 configuration register is 0. This means that it becomes the source of the BIT_CLK. This requires a 24.576 MHz crystal input. In order to reduce board design issues caused by the different loading of the 24.576 MHz when docked and un-docked, superlink will provide a buffered version of the 24.576 MHz clock to the dock connector.

When the superlink device is in the dock the device will take on the functions of the digital Controller. If superlink is acting as the primary codec, the secondary superlink will receive BIT_CLK for the primary codec on the dock and source the SYNC signal to the codecs. If superlink is acting as two secondary codecs in the notebook, the secondary superlink device will source both BIT_CLK and SYNC to the codecs on the dock.

For FIFO Control, superlink preferably has enough AC-Link FIFO space to hold at a minimum of two AC-Link frames for each SDATA_IN pin and for the SDATA_OUT pin.

For the AC-link sync, the beginning of all audio sample packets, or Audio Frames, transferred over AC-link is synchronized to the rising edge of the SYNC signal. SYNC is driven by the AC '97 Controller. The AC '97 Controller takes BIT_CLK as an input and generates SYNC by dividing BIT_CLK by 256 and applying some conditioning to tailor its duty cycle. This yields a 48 kHz SYNC signal whose period defines an audio frame. Data is transitioned on the AC-link on every rising edge of BIT_CLK, and subsequently sampled on the receiving side of the AC-link on each immediately following the falling edge of BIT_CLK. When enabled on the dock, the superlink device sources the SYNC signal. This signal is generated and synchronized to the beginning of the audio frame as described in the AC '97 Component Specification. The superlink device will not begin sourcing SYNC on the dock until the AC-Link has been enabled in configuration space and the primary superlink has received a SYNC from the digital controller.

For the AC Link Interface, the audio output frame data stream corresponds to the multiplexed bundles of all digital output data targeting AC '97's DAC inputs, and control registers. The audio input frame data stream corresponds to the multiplexed bundles of all digital input data targeting the AC '97 Controller.

A cold reset is achieved by asserting RESET# for the minimum specified time. By driving RESET# low, BIT_CLK, and SDATA_OUT will be activated, or re-activated as the case may be, and all AC '97 control registers will be initialized to their default power on reset values. RESET# is an asynchronous AC '97 input.

Low Power Mode and Warm Reset will next be described. If the primary superlink is operating as the primary codec, the primary superlink device will monitor the SDATA_OUT pin and shut down the BIT_CLK when a write occurs to bit PR4 of the Powerdown Control/Status Register (Index 26). Superlink will pass a warm reset across the serial link when acting as either a primary or a secondary codec. When operating as a primary codec, superlink will also restart the BIT_CLK when a warm reset is received. A warm reset comprises SYNC going high for a minimum of 1us in the absence of BIT_CLK.

Superlink needs to monitor the SDATA_OUT pin for a register reset to a codec behind the secondary superlink. A register reset is any write to the Reset Register (Index 00h). If a register reset is detected for a codec ID behind the secondary superlink, all data frames from that codec shall ignored and codec not ready shall be delivered to the digital controller until the reset is delivered to the codec behind the secondary superlink.

The AC '97 controller preferably implements a plurality of configuration registers, such as Activate, Base Address MSB Register, Base Address LSB Register, Interrupt number and Wake-up on IRQ Enable Register, Interrupt type, Report no DMA Assignment, and AC'97 Configuration Register, as examples.

A preferred embodiment of the USB hub block 344 of FIG. 6 will next be described. The USB Hub Block implements one upstream port and four downstream ports. The internal address/data/control connection is provided for programming by BIOS the USB Vendor ID, Product ID, Device Revision Number and number of down stream ports by accessing the Hub Control register. USB cable data is not transmitted or received via the internal connection.

The USB Hub Block implements the requirements defined in the USB Hub Device Class Specification Version 1.1 (USB Specification 1.1, Chapter 11), including Status Change Endpoint, Hub class specific descriptors and Hub class specific requests. The USB Hub Block supports Suspend and Resume both as a USB device and in terms of propagating Suspend and Resume signaling. It also supports remote wakeup by a device on downstream ports. This block can be strapped to be self-powered or bus powered. It supports low power mode via suspend and resume signaling, and very fast repeater logic is implemented for low port-to-port delays. There is no Base I/O Address range allocated to the USB Hub Block.

Features of the USB Hub Block preferably include: Fully Compliant to USB Specification; Version 1.1; handles all Hub Class device descriptors; connectivity to 1 upstream port and 4 downstream ports; power management; device connect/disconnect detection; Bus Fault detection and recovery; full Speed and Low Speed device support; Self-Powered and Bus-Powered support; Programmable ganged and individual port power control; USB protocol handing completely in hardware; Hub control command execution in hardware; and Status Change Endpoint supports in hardware.

Basic blocks of a USB Hub basic blocks include a Hub Repeater, Serial Interface Engine (SIE), and a Hub Controller. The Hub Repeater function is to pass data from the upstream port to all enabled downstream ports and/or from one of the downstream ports to the upstream port. (Multiple downstream ports cannot be transmitting data simultaneously, according to USB protocol. If that happens, it would be an error and is handled separately.) This block also handles the global and remote suspend and resume signaling between the upstream and downstream ports. The SIE handles all USB serial protocols. It also does the data encoding/decoding, CRC checking/generation and data conversion between serial and parallel data. The Hub Controller has two endpoints, Endpoint0 and an Interrupt Endpoint. Through Endpoint 0, the USB host can get the configuration information and status of the hub and also control the hub for enabling/disabling ports, turning power on/off, and various other controllable features. The Interrupt Endpoint is polled by the host a regular interval and is used by the hub to inform the host of any changes in the ports or hub status.

The USB hub may also include transceivers comprising a differential receiver, two single ended receivers and two drivers. There are five of these blocks, one for the upstream root port and one each for the four downstream ports. They are capable of transmitting and receiving data at 12 Mbit/sec and 1.5 Mbit/sec, meeting the USB requirements. The USB hub may also include clock circuitry that can take in the crystal or oscillator input and generate the 48 MHz clock signals needed for the core logic blocks. Depending on its current consumption, this clock may need to stopped when a SUSPEND_OUT signal is generated by the core indicating that a suspend mode has been entered.

Other components of the USB hub include a Serial Interface Engine (SIE) that implements the protocol layer of the USB. It does the clock recovery, error-checking, data conversion between serial and parallel data, does the handshake on the USB bus if the packet was directed to it, bus timeout if response from the host is late, and all other USB protocol related functions. It comprises a Digital Phase Locked Loop (DPLL) for clock recovery from the incoming data, CRC checker and generator, bit stuff and bit removal logic, NRZI encoder/decoder, shift register for serial/parallel conversion, PID decoder, data toggler and sync detect logic.

Also included in the USB hub is a SIE interface unit (SIU). The SIE Interface Unit's main function is to compare the device and endpoint address in the token packet with the valid device and endpoint address from the Hub Interface Unit (HIU). The SIU generates an address valid signal to the SIE so it can complete the handshake, and to HIU so it get can get started waiting for the data phase.

The USB hub may also include a Hub Interface Unit comprising all the control blocks necessary to execute commands from the host to the hub. These may be generic device commands or hub class specific commands. The main blocks under the HIU are the Endpoint Interface (EPI), Hub Command Unit (HCU) and the Status Register (CSR). An Endpoint Interface (EPI), also referred to as GFI in other documents, comprises control engines for each endpoint in the core. The Endpoint 0 engine implements the USB "control endpoint" protocol and it interfaces with the SIE and SIU on one side and the HCU and CSR on the other. The IN Endpoint control engine responds to the host with the status change information in the CSR.

A hub command unit (HCU) is a block of logic that executes the command received during a SETUP, when instructed to do so by the EPI block. Preferably, most of the commands are simple, such as Set Feature or Clear Feature, do not require multiple packets and are executed in a single cycle. Some commands, like Get Descriptors, take multiple packets to complete the transaction. All the descriptors related to the hub are stored in a ROM in the HCU. All the required commands for the hub are supported.

A Hub Repeater may be included in the USB hub comprising logic for port control, repeater state machine and data multiplexers for data out to upstream and each downstream port. The port control manages the connectivity/dis-connectivity, suspend/resume, reset and EOP timing. The repeater state-machine manages the direction of the data multiplexers, and detection of error condition like babble or loss of activity.

The USB hub may include a Frame timer that runs at stable 12 MHz clock and is reset when Start of Frame (SOF)

is received from the host. This timer is used to generate End of Frame times (EOF1 and EOF2) needed by the RPTR block to detect babble.

Also included may be a suspend timer that is used to detect inactivity on the upstream port. If no SOF is received for more than 3 ms, the hub enters a suspend state. It then waits another 2 ms and if SOF has still not been received a SUSPEND signal is asserted and core enters a low power suspend state. For power conservation the USB Hub Block turns off internal hub clocks during Suspend, as follows. The Hub Block responds to two types of Suspend. Selective (or Port) Suspend and Global Suspend. Segments of the bus can be selectively suspended by sending the command SetPort-Feature (PORT_SUSPEND) to the hub port to which that segment is attached. The suspended port will block activity to the suspended bus segment. Because other ports on the hub remain active, internal clocks are not turned off.

Global Suspend is used when no communication is desired anywhere on the bus and the entire bus is placed in the Suspend state. The host signals the start of global suspend by ceasing all its transmissions (including the SOF token). As the hub block, and each device on the bus, recognizes that the bus is in the idle state for the appropriate length of time, it goes into the Suspend state. Because all bus segments attached to the hub are in the Suspend state, the hub will turn off the internal 24 MHz driven PLL. In addition, 48 MHz is stopped in the Hub Block. The clock oscillator control circuitry outside USB Hub block can use the SUSPEND signal to stop the oscillator and conserve power. It can also use the STOP_CLK pin to stop the clock at any time to the core. On a de-assertion of the SUSPEND signal, clock control circuitry should enable the clock and the clock should become stable within a specific period of time, e.g., 10 ms, after the removal of SUSPEND.

The Hub Block will resume from a suspend state by receiving any non-idle signaling by a remote wakeup enabled device on its downstream ports or resume signaling on its upstream port. If the Hub has been enabled as a remote wakeup source, it will also Resume from connects and disconnects on downstream ports. The internal 24 MHz driven PLL (and the 48 MHz in the Hub Block) will be started to complete the Resume.

Each port on the USB hub has its own state machines and set of status registers. The status registers are set and cleared by decoded USB commands received from the HCU, depending on the bits, while some others are set or cleared by the state of the port. One state machine keeps track of the state of the port, i.e. Connected, Enabled, Suspended, etc. Another state machine keeps track of the state of the bus.

A Hub Command Unit executes the USB commands received from the host. It executes both standard device class commands and hub class commands. All the required commands and some of the optional commands are supported, as listed below. For details on the meaning of each command please refer to USB Specification Version 1.1.

Standard requests may include: SET_ADDRESS; GET_STATUS, device, interface, endpoints; GET_DESCRIPTOR, device, configuration, interface, endpoints; GET_CONFIGURATION, device; SET_FEATURE, device, interface, endpoints; CLEAR_FEATURE, device, interface, endpoints; SET_INTERFACE; and GET_INTERFACE, as examples.

Hub class requestions may include: CLEAR_HUB_FEATURE; CLEAR_PORT_FEATURE, per port; GET_HUB_DESCRIPTOR; GET_HUB_STATUS; GET_PORT_STATUS, per port; SET_HUB_FEATURE; and SET_PORT_FEATURE, per port, as examples.

A preferred embodiment of the serial EPROM interface (integrated with USB Hub) 392 of FIG. 6 will next be described. The superlink USB Hub has an on-chip end-device (compliant with USB device specification, please refer to Chapter 9, USB Specification Version 1.1) for storing some information, which may be read and written by the host through the USB Hub upstream port. To USB Hub, this end-device is a permanently attached device (which is beyond those 4 downstream ports mentioned in section 14, USB Hub), which has serial interface with outside EPROM. It contains 1K (or 2K) memory space. After poweron reset, the serial EPROM interface performs a one-time access read operation from the outside EPROM. All the data read from the EPROM will be stored inside the onchip memory space. Then the host can access all the information through the USB Hub port. This serial EPROM interface provides communication between the superlink and the EPROM, which is an industry standard 2 wire serial bus protocol—CLOCK and DATA. The superlink can set the EPROM output enable to '1', which can be USB power on reset, then access those bits.

To interface to the outside EPROM, after system power-on reset, initially, the DATA signal will be driven by the serial EPROM interface to send a start bit (1), which is followed by the read instruction (10) and the starting-word address (00000). Once the read instruction is received, the instruction and address are decoded by the EPROM, which then sends the data to the output shift register. At this point, the interface stops driving the DATA signal and the EPROM starts driving. A dummy (0) bit is then output and all the data in the EPROM are output with the most significant bit (MSB) first. The output data changes are triggered by the rising edge of the clock provided by the serial EPROM interface on the CLOCK signal. Any EPROM used must have the automatic internal address advance function. After finishing reading all the data from the EPROM, the interface may put the EPROM interface into a high-impedance condition (pulled down internally) to allow other logic to share the EPROM.

A preferred embodiment of the docking control 380 block of FIG. 6 will next be described. The purpose of the docking control 380 function of superlink is to notify the system when a dock or undock event occurs, provide low-level control signals that are appropriate for use within the notebook platform or the docking station, and to provide status information to the notebook in the form of runtime status registers.

Seven docking scenarios are considered:
1) Dock Event with Notebook Powered On—The docking station is plugged into the wall and operating in a low power state. The notebook is powered on and is operating in a fully powered state when the user connects the notebook to the docking station;
2) Dock Event with Notebook in Low Power State—The docking station is plugged into the wall and operating in a low power state. The notebook is powered on and is operating in a low power state when the user connects the notebook to the docking station;
3) Dock Event with Notebook Powered Off—The docking station is plugged into the wall and operating in a low power state. The notebook is powered off when user then connects the notebook to the docking station;
4) Undock Event with Notebook Powered On—The docking station is plugged into the wall and operating in a fully powered state. The notebook is powered on and is operating in a fully powered state when the user requests for permission to detach the docking station;

5) Undock Event with Notebook in Low Power State—The docking station is plugged into the wall and operating in a fully powered state. The notebook is powered on and is operating in a low power state when the user requests for permission to detach the docking station;

6) Surprise Removal with Notebook Powered On—The docking station is plugged into the wall and operating in a fully powered state. The notebook is powered on and is operating in a fully powered state when the user unplugs the docking station; and 7) Surprise Removal with Notebook in Low Power State—The docking station is plugged into the wall and operating in a fully powered state. The notebook is powered on and is operating in a low power state when the user unplugs the docking station.

The following assumptions are made with respect to the order of operations in the system when the dock and undock events occur. Note that for superlink, preferably, the device is taken from a low power state to a high power state by applying power to the $V_{DD}$ rail instead of only the $V_{SB}$ rail. The dock and undock events are triggered by an input to a superlink running in primary mode called CONN_DETECT. This input terminal must be monitored when fully powered and while in a low power state.

A preferred embodiment of a method for a dock event will next be described. First, CONN_DETECT pin transitions to a high logic level to indicate a valid docking connection occurred. The primary superlink notifies the system of the event (PME#, SMI) and updates the event register (DOCKS and UDCKS) to indicate a dock attach event. If a wake event (PME#) is signaled from a low power state, the BIOS will apply $V_{DD}$ to the primary superlink. This should internally reset all state machines and clear all registers that are not significant as part of the PME context (PME enables, mask bits, status bits, etc.). The system BIOS turns on the high speed serial link interface in the primary superlink (XTALEN). The primary superlink drives XTAL_ENABLE# low to activate the high-speed reference clock. The primary superlink begins the negotiation and startup sequence on the high speed serial link. The system BIOS uses the SMBus to apply $V_{DD}$ and bring the docking station and secondary superlink into a fully powered state. An external reset PO_RST# may be used in the docking station to bring the secondary superlink into a valid initial state. The secondary superlink drives XTAL_ENABLE# low to activate the high-speed reference clock. The phy synchronization and initialization between primary and secondary nodes is completed. The primary superlink resets the secondary superlink by way of a link reset and communicates link configuration information bringing the link to an active packet transmission state. The primary superlink updates the LKRDY and LKDED event registers and sets L_RDY high to indicate that the superlink interface is ready. The primary superlink begins to respond to LPC transactions targeted toward the docking station.

A preferred embodiment of a method for a undock event will next be described. First, the user indicates to the system that the user wishes to undock the notebook either through a GPIO event (user button) or through a menu command. If undock request is through a user push-button the primary superlink notifies the system of the request through the event notification (PME#, SMI,). Superlink has no specific knowledge of this. If a wake event (PME#) is signaled from a low power state, the BIOS will apply $V_{DD}$ to the primary superlink. This should internally reset all state machines and clear all registers that are not significant as part of the PME context (PME enables, mask bits, status bits, etc.). The system BIOS uses the SMBus to bring the docking station and secondary superlink into a low power state. In response, the secondary superlink drives XTAL_ENABLE# high to disable the high-speed reference clock. The system BIOS should also set the XTALEN bit low to disable REFCLK and disable the high speed serial link in the primary superlink. The primary superlink sets L_RDY low to indicate that the superlink interface has successfully closed and updates LKRDY and LKDED event registers. The BIOS unlocks the docking connector (possibly through a primary superlink LPC function). CON_DET status bit transitions to a low logic level and the DOCKS and UDCKS event registers update to indicate that the user has physically disconnected the dock. The primary superlink notifies the system of the event (PME#, SMI).

Upon the occurrence of a surprise removal of the portable computer from the docking station, preferably the following sequence is implemented. CONN_DETECT pin transitions to a low logic level to indicate that the user has physically disconnected the dock. The primary superlink notifies the system of the event (PME#, SMI) and updates the event registers (DOCKS and UDCKS) to indicate a (surprise) removal. The primary superlink detects that LKRDY and LKDED status changed and responds by driving XTAL_ENABLE# high to disable the high-speed reference clock. The device also clears XTALEN in response to the change in CON_DET.

Note that it is highly likely that the superlink will primarily be in a low power state when undocked, and preferably always in a high power state when docked. An exception is when the docking station is connected before the notebook is powered on. In addition, the CONN_DETECT input terminals must be de-bounced over a 1 to 2 ms period. Preferably, only the first transition should latch into the event status register. A guaranteed maximum delay between the time that the event is signaled and the transition of the LKRDY event must exist in order for the system BIOS to hold off LPC request.

While embodiments of the present invention are described herein with reference to portable notebook computers, they also have useful application in other portable computing applications, such as PDA's (e.g. Palm Pilots), cell phones having computing capabilities, and wearable computers, as examples. The I/O ports of the portable computing applications of embodiments of the present invention may comprise USB, AC-97, serial ports, floppy disk controller (FDC), IEEE 1284, IEEE 1394 or memory expansion interface ports, as examples. The memory expansion interface ports may be adapted to interface with flash, multi-media card (MMC), smart media, smart card, or memory stick memory devices, as examples.

Embodiments of the present invention provide several advantages over prior art docking systems and methods. A smaller docking connector is required, saving cost and space. The smaller connector is less likely to become damaged, and is less expensive to replace. The system and method is adapted to function with legacy ports as well as the novel low-pin-count docking connector described herein; thus, embodiments of the invention advantageously facilitate the gravitation away from the use of legacy ports to the low-pin-count serialize docking connector of embodiments of the present invention. A smaller amount of physical space is required on the portable computer for the docking connection. Platform hardware and software changes are not required because the I/O protocol serialization is transparent to the portable computer. The LPC I/O bridge device eliminates compatibility concerns associated with legacy port replication.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. In addition, the order of process steps may be rearranged by one of ordinary skill in the art, yet still be within the scope of the present invention. It is therefore intended that the appended claims encompass any such modifications or embodiments. Moreover, the scope of embodiments of the present application is not intended to be limited to the particular embodiments of the process, machine, manufacture, composition of matter, means, methods and steps described in the specification. Accordingly, the appended claims are intended to include within their scope such processes, machines, manufacture, compositions of matter, means, methods, or steps.

What is claimed is:

1. A portable computer comprising:
   an I/O bus;
   a plurality of I/O ports;
   a docking connector including a low pin count serial I/O port;
   a low pin count I/O bridge device coupled to said I/O bus and said docking connector, said low pin count I/O bridge device including:
     an LPC controller coupled to said I/O bus and said docking connector adapted
       to detect whether the portable computer is coupled to a docking station via said docking connector,
       to route data transmissions from said I/O bus to said I/O ports if the portable computer is not coupled to a docking station via said docking connector, and
       to route data transmissions from said I/O bus to said low pin count serial I/O port of said docking connector if the portable computer is coupled to a docking station via said docking connector; and
     serialization logic coupled to the LPC controller adapted to serialize the data transmissions routed to said low pin count serial I/O port of said docking connector.

2. The portable computer according to claim 1, wherein the I/O ports comprise USB, AC-97, serial ports, floppy disk controller (FDC), IEEE 1284, IEEE 1394 or memory expansion interface ports.

3. The portable computer according to claim 1, wherein the portable computer comprises a notebook computer, personal digital assistant (PDA), or wearable computer.

4. The portable computer according to claim 1, wherein the LPC I/O bridge device further comprises a packetizer/depacketizer coupled to the serialization logic and LPC controller, and a system management (SM) bus controller, floppy drive controller,
   configuration and control registers, a watchdog timer, a fan speed control and monitor, and an Advanced Configuration and Power Interface (ACPI) coupled to the LPC controller.

5. The portable computer according to claim 1, further comprising:
   configuration and control registers, a watchdog timer, a fan speed control and monitor, and an Advanced Configuration and Power Interface (ACPI) coupled to said LPC controller.

6. The portable computer according to claim 2, wherein the memory expansion interface ports are adapted to interface with flash, multi-media card (MMC), smart media, smart card, or memory stick memory devices.

7. A docking system, comprising:
   a portable computer including
     an I/O bus;
     a plurality of I/O ports;
     a computer docking connector including a low pin count serial I/O port;
     a low pin count I/O bridge device coupled to said I/O bus and said computer docking connector, said low pin count I/O bridge device including:
       an LPC controller coupled to said I/O bus and said computer docking connector adapted
         to detect whether the portable computer is coupled to a docking station via said computer docking connector,
         to route data transmissions from said I/O bus to said I/O ports if the portable computer is not coupled to a docking station via said computer docking connector, and
         to route data transmissions from said I/O bus to said low pin count serial I/O port of said computer docking connector if the portable computer is coupled to a docking station via said computer docking connector; and
       serialization logic coupled to the LPC controller adapted to serialize the data transmissions routed to said low pin count serial I/O port of said computer docking connector; and
   a docking station having a docking station docking connector coupleable to said computer docking connector.

8. The docking system according to claim 7, further comprising:
   a packetizer/depacketizer coupled to said serialization logic and said LPC controller.

9. The docking system according to claim 7, further comprising:
   a system management (SM) bus controller, and floppy drive controller coupleable to said LPC controller.

10. The docking system according to claim 7, further comprising:
    configuration and control registers, a watchdog timer, a fan speed control and monitor, and an Advanced Configuration and Power Interface (ACPI) coupled to said LPC controller.

11. The docking system according to claim 9, wherein the I/O ports comprise USB, AC-97, Ethernet, or IEEE 1284, IEEE 1394, or memory expansion interface ports, wherein the portable computer comprises a notebook computer, personal digital assistant (FDA), or wearable computer, and wherein the docking station comprises a port replicator or expansion chassis.

12. The docking station according to claim 11, wherein the memory expansion interface ports are adapted to interface with flash, multi-media card (MDC), smart media, smart card, or memory stick memory devices.

* * * * *